US012800134B2

(12) United States Patent
Schmittinger et al.

(10) Patent No.: US 12,800,134 B2
(45) Date of Patent: Nov. 17, 2026

(54) STAND LIGHT

(71) Applicant: MILWAUKEE ELECTRIC TOOL CORPORATION, Brookfield, WI (US)

(72) Inventors: Jeremy A. Schmittinger, Waukesha, WI (US); Gregory A. Mutchler, Milwaukee, WI (US); Bennett H. Speaks, Milwaukee, WI (US); Chelsea L. Rubietta, Loveland, OH (US); Samantha J. Krugel, Wauwatosa, WI (US); Duane W. Wenzel, Mukwonago, WI (US); Ashton L. Krepelka, Shorewood, WI (US); Sullivan Dee, West Allis, WI (US); John N. Winkler, Milwaukee, WI (US); Hunter T. Kollmann, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/226,603

(22) Filed: Jun. 3, 2025

(65) Prior Publication Data

US 2025/0369602 A1 Dec. 4, 2025

Related U.S. Application Data

(60) Provisional application No. 63/761,692, filed on Feb. 21, 2025, provisional application No. 63/655,901, filed on Jun. 4, 2024.

(51) Int. Cl.

*F21V 21/22* (2006.01)
*F21V 21/06* (2006.01)

(Continued)

(52) U.S. Cl.

CPC .............. *F21V 21/22* (2013.01); *F21V 21/06* (2013.01); *F21V 21/145* (2013.01); *F21V 21/30* (2013.01);

(Continued)

(58) Field of Classification Search

CPC .......... F21V 21/22; F21V 21/06; F21V 17/06; F21V 23/06; F21V 21/30; F21V 21/26;

(Continued)

(56) References Cited

U.S. PATENT DOCUMENTS 1,919,114 A * 7/1933 Ley ......................... F21V 21/22 403/112
2,952,485 A 9/1960 Hammond et al.

(Continued)

FOREIGN PATENT DOCUMENTS

CN 104728230 A 6/2015
CN 217519811 U 9/2022

(Continued)

OTHER PUBLICATIONS

Bus Stand Lamp Using Piezoelectric Energy (Year: 2014).*

*Primary Examiner* — Thien T Mai
(74) *Attorney, Agent, or Firm* — Michael Best & Friedrich LLP

(57) ABSTRACT

A stand light includes a base and a light head. The light head is extendable away from the base via extension poles. The extension poles and related hardware provide improved ability for the extension poles to remain in an extended position when partially elevated.

16 Claims, 27 Drawing Sheets

(51) Int. Cl.

| | |
|---|---|
| ***F21V 21/14*** | (2006.01) |
| ***F21V 21/30*** | (2006.01) |
| ***F21V 21/40*** | (2006.01) |
| ***F21V 23/02*** | (2006.01) |
| ***F21Y 115/10*** | (2016.01) |

(52) U.S. Cl.
CPC .............. *F21V 21/40* (2013.01); *F21V 23/02* (2013.01); *F21Y 2115/10* (2016.08)

(58) Field of Classification Search
CPC . F21V 21/40; F21V 3/02; F21V 23/02; F21V 21/14; F21V 17/14; F21V 17/10; F21V 19/02; F21Y 2115/10; F21Y 2103/00
See application file for complete search history.

(56) References Cited

U.S. PATENT DOCUMENTS

| | | | | |
|---|---|---|---|---|
| 4,526,334 | A | 7/1985 | Rantakari | |
| 6,676,326 | B2 | 1/2004 | Wu | |
| 7,007,909 | B2 | 3/2006 | Hsieh | |
| 7,178,767 | B2 | 2/2007 | Steyn et al. | |
| 7,607,855 | B2 | 10/2009 | Lai | |
| 8,201,979 | B2 | 6/2012 | Deighton et al. | |
| 8,651,438 | B2 | 2/2014 | Deighton et al. | |
| 9,303,853 | B2 | 4/2016 | Deighton et al. | |
| D850,689 | S | 6/2019 | Harvey et al. | |
| 10,378,739 | B2 | 8/2019 | Harvey et al. | |
| D883,549 | S | 5/2020 | Harvey et al. | |
| 10,690,304 | B2 | 6/2020 | Adams et al. | |
| D902,463 | S | 11/2020 | Harvey et al. | |
| 10,907,809 | B2 | 2/2021 | Harvey et al. | |
| 11,015,773 | B2 | 5/2021 | Adams et al. | |
| 11,112,096 | B2 | 9/2021 | Harvey et al. | |
| 11,143,389 | B2 | 10/2021 | Proeber et al. | |
| 11,181,228 | B2 | 11/2021 | Akiba et al. | |
| 11,306,904 | B1 | 4/2022 | Harvey et al. | |
| 11,512,820 | B2 | 11/2022 | Adams et al. | |
| 11,530,799 | B2 | 12/2022 | Harvey et al. | |
| 11,674,673 | B2 | 6/2023 | Proeber et al. | |
| 11,725,807 | B2 | 8/2023 | Harvey et al. | |
| 11,873,967 | B2 | 1/2024 | Adams et al. | |
| 11,873,977 | B2 | 1/2024 | Cornell et al. | |
| 11,933,481 | B2 | 3/2024 | Proeber et al. | |
| 12,000,572 | B2 | 6/2024 | Harvey et al. | |
| D1,037,521 | S | 7/2024 | Harvey et al. | |
| 12,038,161 | B2 | 7/2024 | Chen | |
| 12,044,389 | B2 | 7/2024 | Chen | |
| 12,173,863 | B2 | 12/2024 | Adams et al. | |
| D1,080,983 | S | 6/2025 | Harvey et al. | |
| 12,422,130 | B2 | 9/2025 | Cornell et al. | |
| 12,474,037 | B1 | 11/2025 | Chen et al. | |
| 2003/0090904 | A1 * | 5/2003 | Ching .................. | G06F 3/0202 362/418 |
| 2004/0206879 | A1 | 10/2004 | Steyn et al. | |
| 2013/0228051 | A1 | 9/2013 | Huang | |
| 2018/0038545 | A1 | 2/2018 | Ma | |
| 2023/0130809 | A1 | 4/2023 | Xia | |
| 2024/0102638 | A1 | 3/2024 | Cornell et al. | |
| 2024/0219008 | A1 | 7/2024 | Proeber et al. | |
| 2024/0255129 | A1 | 8/2024 | Harvey et al. | |
| 2025/0138401 | A1 | 5/2025 | Li et al. | |
| 2025/0224655 | A1 | 7/2025 | Li | |

FOREIGN PATENT DOCUMENTS

| | | | | |
|---|---|---|---|---|
| CN | 116398852 | A | 7/2023 | |
| CN | 220396194 | U | 1/2024 | |
| CN | 117889417 | A | 4/2024 | |
| CN | 221004942 | U | 5/2024 | |
| CN | 221146373 | U | 6/2024 | |
| CN | 223121100 | U | 7/2025 | |
| DE | 8817022 | U1 | 2/1992 | |
| WO | 2013157992 | A1 | 10/2013 | |
| WO | WO-2021008343 | A1 * | 1/2021 | ................ F21S 6/00 |
| WO | 2025082370 | A1 | 4/2025 | |

* cited by examiner

STAND LIGHT

CROSS-REFERENCE TO RELATED APPLICATIONS

This application claims priority to U.S. Provisional Patent Application No. 63/655,901, filed Jun. 4, 2024, and to U.S. Provisional Patent Application No. 63/761,692, filed Feb. 21, 2025, the entire contents of both of which are incorporated by reference herein.

FIELD

A portable stand light is disclosed herein. The stand light provides a more compact form and a better performance for a user than existing stand lights. The improvements make the stand light relatively easier to carry on and off a job site and make the stand light easily deployable. While more compact than other, known stand lights, setup functionality and extended height are not diminished. Further, the stand light disclosed herein provides improved shock and abrasion resistance.

SUMMARY

In one aspect a portable stand light includes a casing having a first end, a second end opposite the first end, and a longitudinal axis extending through the first end and the second end; an extension pole slidably received in the casing and being coaxial with the casing, the extension pole being movable out of the first end of the casing between an extended position and a retracted position; a light head coupled to an end of the extension pole; a plurality of legs, each leg including a first end hingedly coupled to the casing and a second end opposite the first end, the second end of each leg being movable between a collapsed position against the casing and an expanded position in which each leg is expanded apart from the casing; and a friction fit system provided between the extension pole and the casing, the friction fit system for applying a force to create friction between the extension pole and the casing, thus retaining the extension pole in the extended position relative to the casing.

In another aspect, which is combinable with any other aspect, the friction fit system includes a bushing and a spring, the spring for applying the force to the bushing to create the friction between the extension pole and the casing, thus retaining the extension pole in the extended position relative to the casing.

In another aspect, which is combinable with any other aspect, the spring is a first spring, and the friction fit system also includes a second spring, the second spring also for applying a force to the bushing to create friction between the extension pole and the casing.

In another aspect, which is combinable with any other aspect, the bushing includes a first cavity and a second cavity spaced apart from the first cavity along the longitudinal axis, and the first spring is seated in the first cavity and the second spring is seated in the second cavity.

In another aspect, which is combinable with any other aspect, the bushing is a first bushing, the friction fit system also includes a second bushing and a second spring provided between the extension pole and the casing, and the first bushing is spaced radially apart from the second bushing around the extension pole.

In another aspect, which is combinable with any other aspect, the spring is a coil spring.

In another aspect, which is combinable with any other aspect, the spring is a linear wave spring.

In another aspect, which is combinable with any other aspect, the spring is positioned between the bushing and a seat, the seat contacting the extension pole and the bushing contacting the casing.

In another aspect, which is combinable with any other aspect, the extension pole includes an aperture therein, the aperture receiving a protrusion of the seat such that the seat is inhibited from moving relative to the extension pole along the longitudinal axis.

In another aspect, which is combinable with any other aspect, the bushing includes a protrusion, and the spring is positioned around the protrusion of the bushing.

In another aspect, which is combinable with any other aspect, the protrusion of the bushing and the spring positioned around the protrusion of the bushing extend into the protrusion of the seat.

In another aspect, which is combinable with any other aspect, the spring is positioned between the extension pole and a retainer, the retainer being seated within the bushing, such that the spring biases the retainer radially away from the extension pole, which biases the bushing radially away from the extension pole, which contacts the casing.

In another aspect, which is combinable with any other aspect, the extension pole includes an aperture therein, the aperture receiving a protrusion of the bushing such that the bushing is inhibited from moving relative to the extension pole along the longitudinal axis.

In another aspect, which is combinable with any other aspect, a stand light includes a casing having a first end, a second end opposite the first end, and a longitudinal axis extending through the first end and the second end; a first extension pole slidably received in the casing and being coaxial with the casing, the first extension pole being movable out of the first end of the casing between an extended position and a retracted position; a second extension pole slidably received in the first extension pole and being coaxial with the casing and the first extension pole, the second extension pole being movable out of the first extension pole between an extended position and a retracted position; a light head coupled to an end of the second extension pole; a plurality of legs, each leg including a first end hingedly coupled to the casing and a second end opposite the first end, the second end of each leg being movable between a collapsed position against the casing and an expanded position in which each leg is expanded apart from the casing; and a friction fit system provided between the first extension pole and the second extension pole, the friction fit system for creating friction between the first extension pole and the second extension pole to retain the second extension pole in the extended position relative to the first extension pole.

In another aspect, which is combinable with any other aspect, the friction fit system includes a bushing and a spring, the spring for applying a force to the bushing to apply the force away from the second extension pole to contact and create the friction between the bushing and the first extension pole, thus retaining the second extension pole in the extended position relative to the first extension pole.

In another aspect, which is combinable with any other aspect, the bushing is a first bushing, and the friction fit system also includes a second bushing and a second spring provided between the first extension pole and the second extension pole.

In another aspect, which is combinable with any other aspect, the spring is positioned between the bushing and a seat, the seat contacting the second extension pole and the bushing contacting the first extension pole.

In another aspect, which is combinable with any other aspect, the second extension pole includes an aperture therein, the aperture receiving a protrusion of the seat such that the seat is inhibited from moving relative to the second extension pole along the longitudinal axis.

In another aspect, which is combinable with any other aspect, the bushing includes a protrusion, the spring is positioned around the protrusion of the bushing, and the protrusion of the bushing and the spring positioned around the protrusion of the bushing extend into the protrusion of the seat.

In another aspect, which is combinable with any other aspect, the spring is positioned between the second extension pole and a retainer, the retainer being seated within the bushing, such that the spring biases the retainer radially away from the second extension pole, which biases the bushing radially away from the second extension pole, which contacts the first extension pole.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

Figure 1:
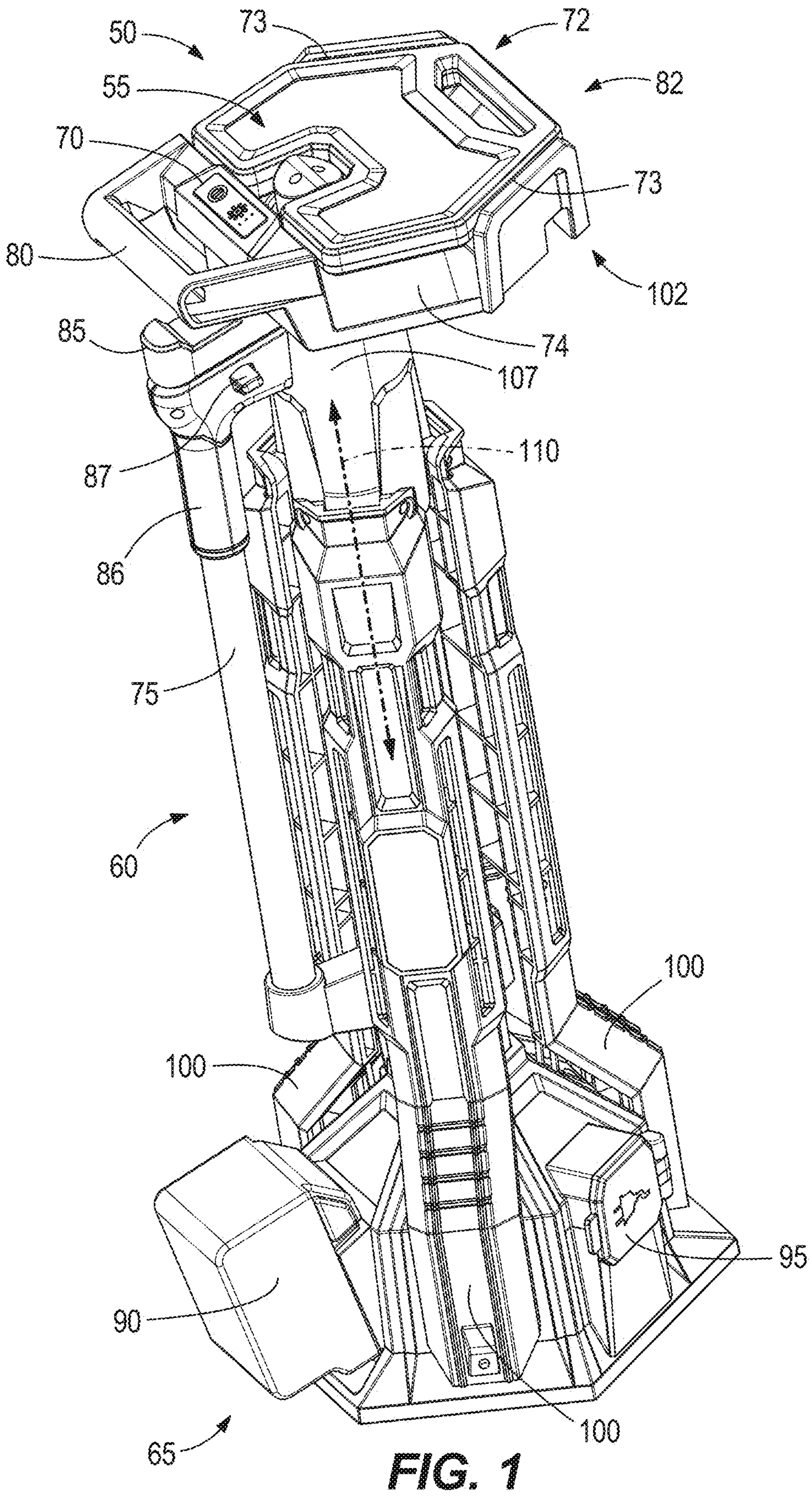
FIG. 1 illustrates a perspective view of a stand light.
Figure 4:
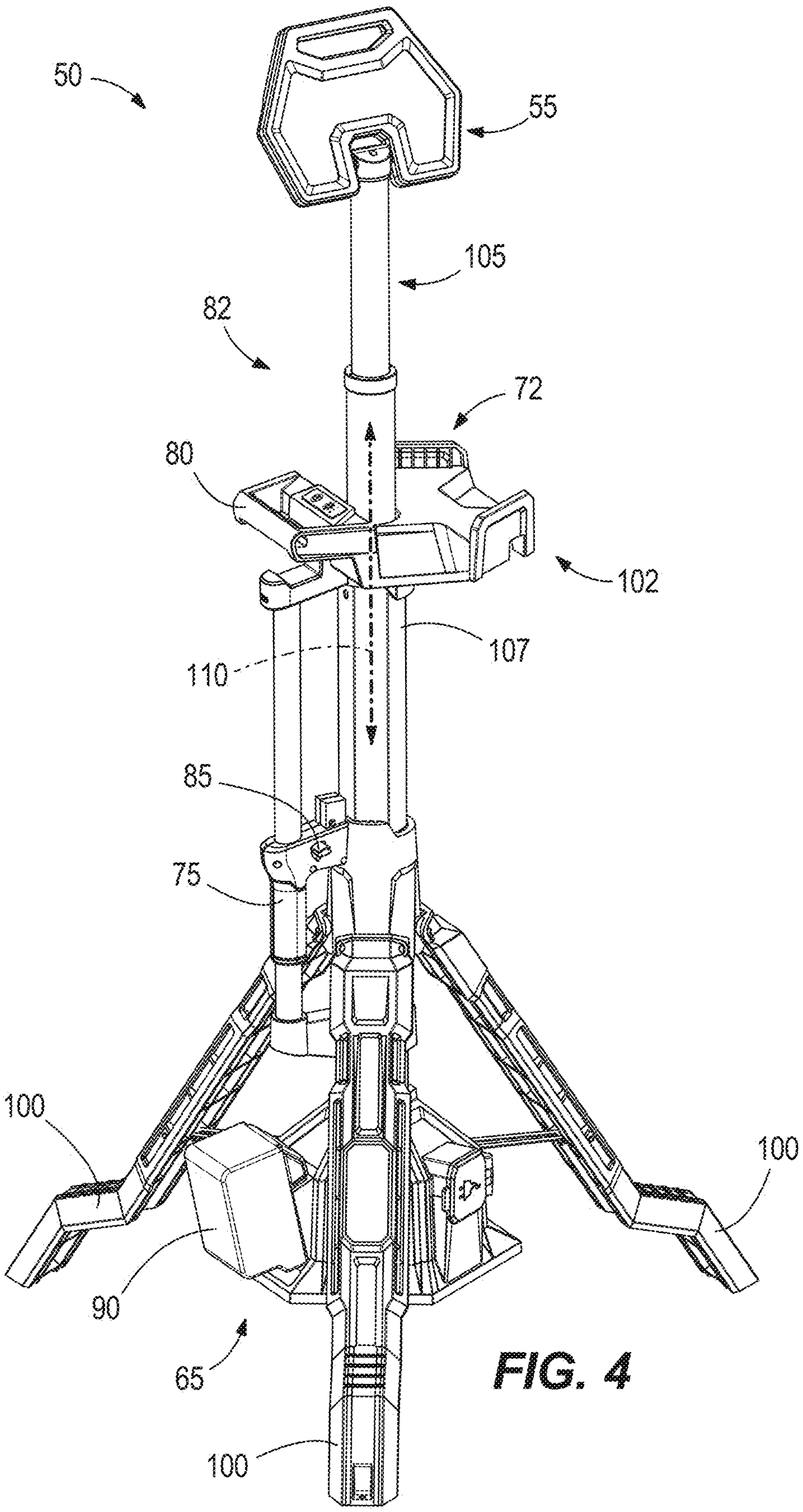
FIG. 4 illustrates a perspective view of the stand light of FIG. 1 in an expanded position.
Figure 6:
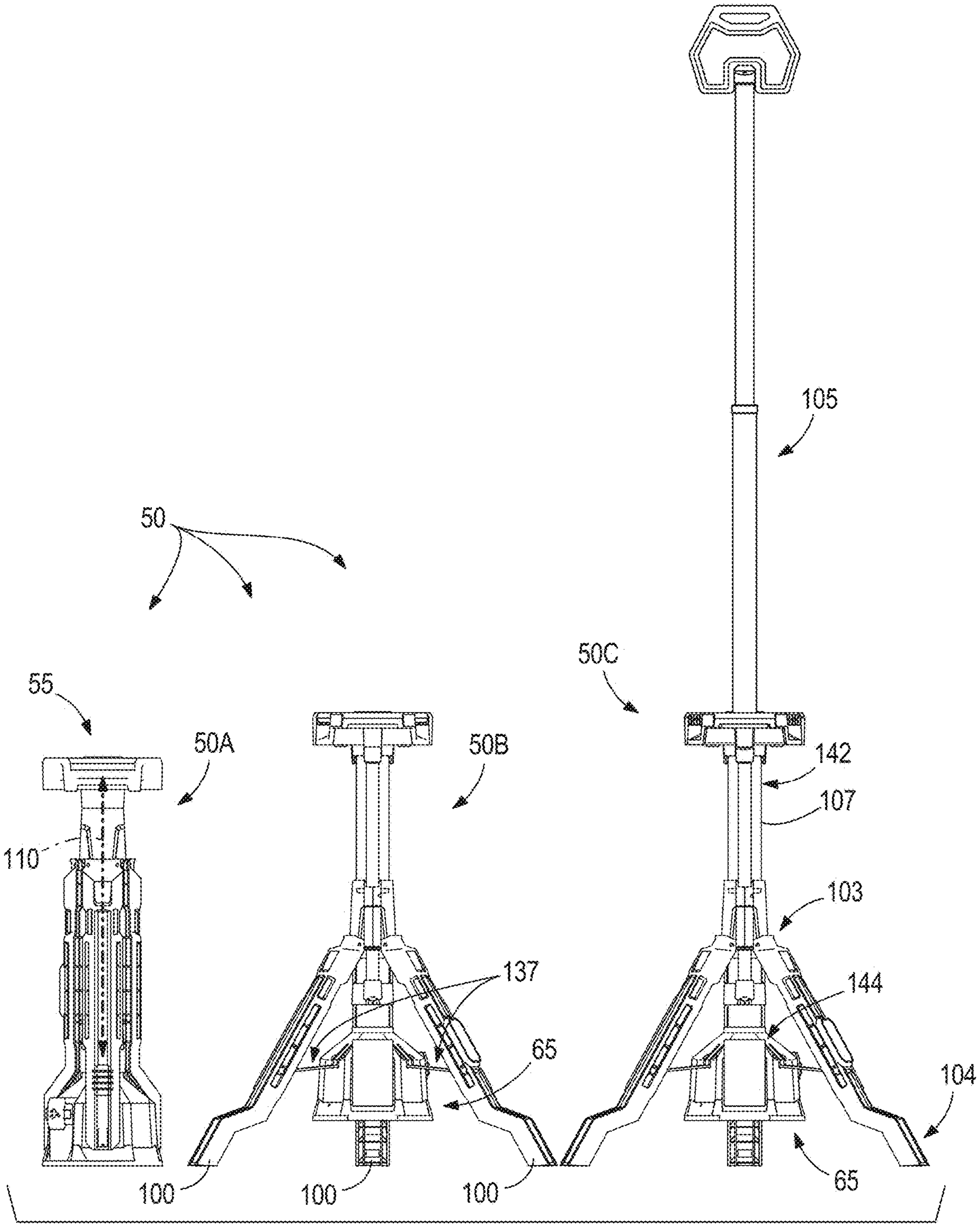
FIG. 6 illustrates various configurations of the stand light of FIG. 1.

FIG. 1 illustrates a stand light 50. The stand light 50 is portable and includes a base 65 and a light head 55. The light head 55 is extendable away from the base 65 via extension poles 105, which are illustrated in FIG. 4. The extension poles 105 and related hardware disclosed herein provide improved ability for the extension poles 105 to remain extended (i.e., to not collapse from an extended position back into a collapsed position as best shown in FIG. 6) when partially elevated. The stand light 50 disclosed herein also provides downwardly directed light or upwardly directed light at maximum extension (i.e., when the extension poles 105 are fully extended). When the extension poles 105 are fully extended, the light head 55 can be positioned, for example, up to seven feet above the ground. The stand light 50 disclosed herein also has the ability to provide ambient lighting to a room. This is accomplished via a "super high" mode with relatively high light output intensity so that the stand light 50 can provide ambient lighting to a whole work area, i.e., an entire room. Additionally, the "super high" mode can provide relatively brighter lighting for a single task, i.e., when light is to be directed onto a relatively smaller work area.

Figure 2:
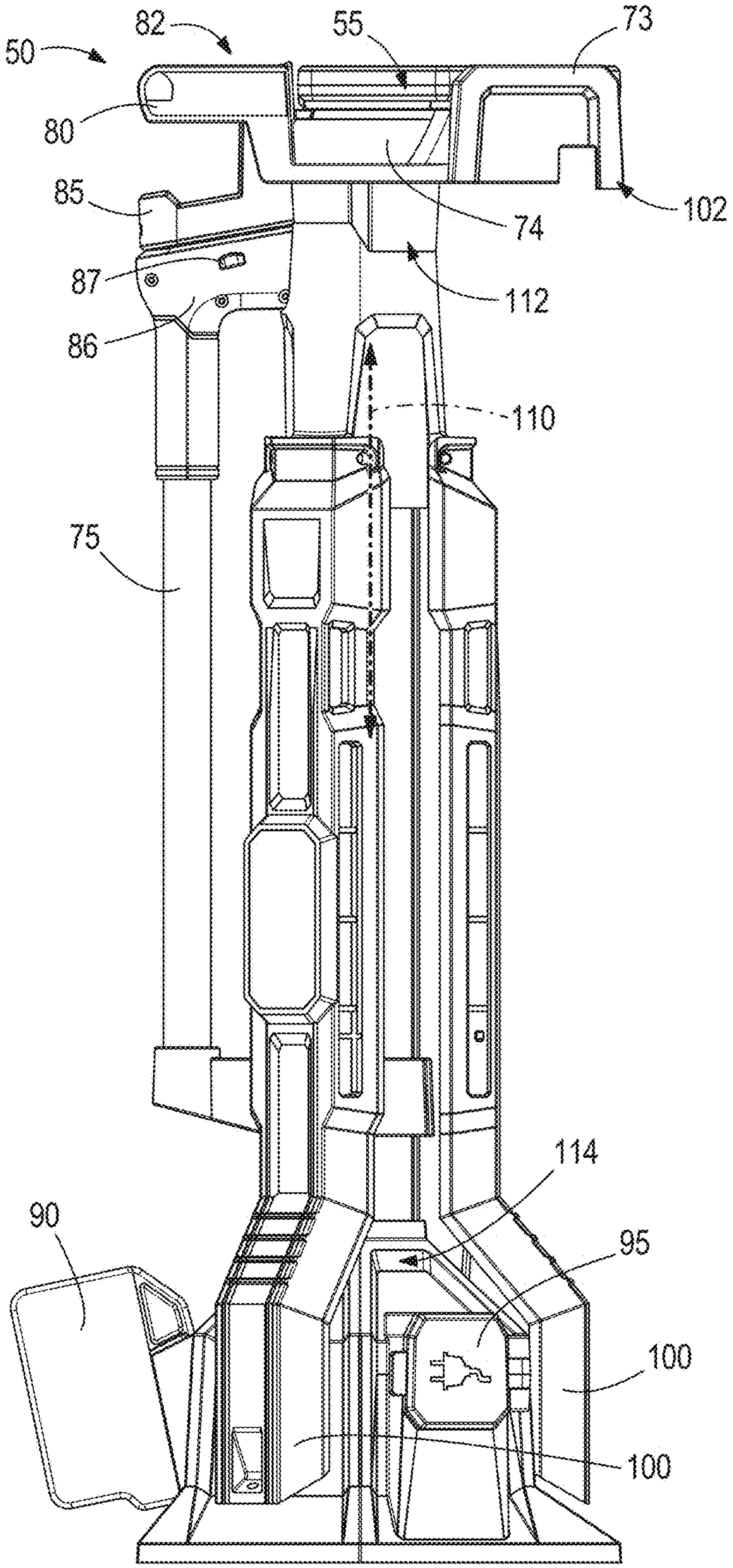
FIG. 2 illustrates a side view of the stand light of FIG. 1.

FIGS. 1 and 2 illustrate the stand light 50 in the collapsed position, and FIG. 4 illustrates the stand light 50 in an extended position. The stand light 50 includes the light head 55 that emits light, a body 60, and the base 65. The body 60 connects the base 65 to the light head 55.

Figure 3A:
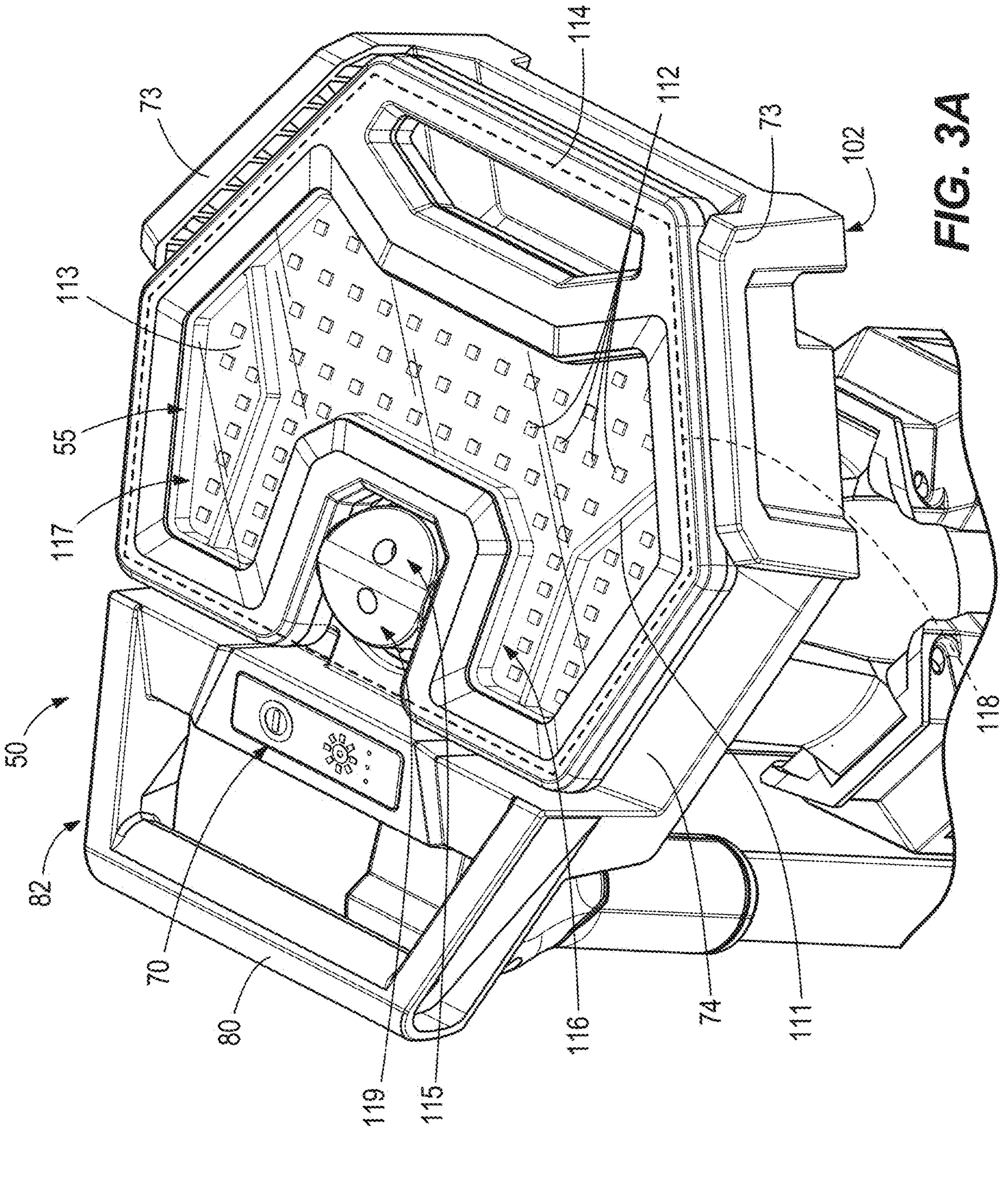
FIG. 3A illustrates a perspective view of an upper assembly of the stand light of FIG. 1.

The body 60 includes an upper assembly 82 that includes a user interface (UI) panel 70. The UI panel 70 includes buttons, lights, etc., with which a user can control various features of the stand light 50. The upper assembly 82 also includes a secondary handle 80 and protrusions 102. The secondary handle 80 is graspable by a user to carry the stand light 50. The protrusions 102 extend outward and then down (i.e., away from a longitudinal axis 110 and then downward along the longitudinal axis 110 toward the base 65) from the rest of the upper assembly 82. The protrusions 102 are adapted to hold the stand light 50 when the stand light 50 is mounted to or placed on other structures, such as a cart (see FIG. 8). As best shown in FIG. 3A, the upper assembly 82 also includes a channel 72, which is made up of, in reference to the longitudinal axis 110, two raised portions 73 delimiting a relatively lower portion 74. The channel 72 is shaped to receive the light head 55 when the light head 55 is stowed, or in other words, when the extension poles 105 are fully collapsed and nested within one another and within the body 60.

As seen in FIGS. 1 and 2, the body 60 also includes a main handle 75 and a protective casing 107. The main handle 75 is arranged perpendicularly to the secondary handle 80. The main handle 75 extends along and is spaced apart from the protective casing 107, and includes a slidable portion 86. The slidable portion 86 is slidable along the main handle 75 in a direction along the longitudinal axis 110. An actuator 87 is provided on the slidable portion 86, and when actuated the slidable portion 86 is unlocked and therefore slidable along the main handle 75. In other examples, instead of the actuator 87, a trigger 85 is located on the main handle 75 to serve to unlock the slidable portion 86 to allow movement along the main handle 75. For illustrative purposes, both are shown in FIGS. 1 and 2, although only one of the trigger 85 and actuator 87 is needed. The longitudinal axis 110 extends from a first end 142 of the casing 107 to a second end 144 of the casing 107. The extension poles 105 are received within the casing 107 and are coaxial with the casing 107, which is generally in the form of an elongate body. The main handle 75 can, in some examples, extend more than half of a length of the stand light 50 along the longitudinal axis 110 (FIGS. 1 and 2), and in other examples, extends less than the length of the stand light 50 along the longitudinal axis (FIG. 4). When the trigger 85 is pressed or the actuator 87 is actuated, the stand light 50 is released from the collapsed position and the legs 100 are extended from a position against the protective casing 107 to support the rest of the stand light 50. While a stand light 50 with three legs 100 is illustrated herein, a stand light 50 with more or less legs 100 is contemplated. The slidable portion 86 is slidable along the main handle 75 with the legs 100, as the legs move along the longitudinal axis 110 and expand away from the casing 107. This is best shown in FIGS. 4 and 6. Referring back to FIGS. 1 and 2, extension poles 105 are housed within the protective casing 107 and are extendable therefrom along the longitudinal axis 110. The longitudinal axis 110 extends along a centerline of the generally cylindrical protective casing 107. The extension poles 105 are nested and retractable within the protective casing 107, and in a telescoping manner are extendable to support the light head 55 at various distances above the upper assembly 82. Stated otherwise, the extension poles 105 support the light head 55 when the light head 55 is seated within the channel 72 and when the light head 55 is in a maximum extended position above the upper assembly 82, and at any point along the longitudinal axis 110 therebetween.

As best seen in FIG. 3A, the light head 55 seats within the lower portion 74 when the extension poles 105 are received within the casing 107 such that the light head 55 is substantially flush with the raised portions 73 of the upper assembly 82. In some configurations, the light head 55 may be recessed relative to the raised portions 73 of the upper assembly 82 when seated within the lower portion 74. The light head 55 is generally hexagonal in shape. The light head connection 115 connects to the light head 55 within a perimeter 118 of the generally hexagonal shape of the light head 55, such that a first lobe 116 and a second lobe 117 extend on opposite sides of the light head connection 115. A space 119 between the first lobe 116 and the second lobe 117 provides clearance for the light head connection 115, and results in a break in the generally hexagonal perimeter 118 of the light head 55 shape. Opposite of the space 119 on the light head 55, a handle 114 is provided. The handle 114 provides a location for a user to grasp the light head 55 to tilt and adjust the light head 55 relative to the light head connection 115. The handle 114 likewise provides a location for a user to pull the light head 55 away from the rest of the stand light 50, thereby extending the extension poles 105 out of the casing 107. By providing the handle 114 and the space 119 as integrated features of the light head 55 that are all in a single plane, a relatively thinner light head 55 is able to be provided. Further, by recessing the light head 55 within the lower portion 74 (which is possible because of the relatively thin design of the light head 55), the raised portions 73 and secondary handle 80 serve to protect the light head 55 during transport of the stand light 50.

The light head 55 further includes a panel 113, which can be opaque or translucent. The panel 113 illustrated in FIG. 3A is half opaque and half translucent for illustrative purposes. As can be seen through translucent sections, light emitting diodes (LEDs) 112 are mounted in rows and columns behind the panel 113, and are mounted on an LED board 111. While the LEDs 112 and LED board 111 are oriented to project light upwards as shown in FIG. 3A, in other embodiments, further LEDs 112 and another LED board 111 can be mounted on the bottom (as oriented in FIG. 3A) to project light downward (e.g., in an opposite direction that the LEDs 112 in FIG. 3A project light). By mounting LEDs 112 that face more than one direction, better light coverage of a work area can be achieved. Other layouts of the LEDs 112 are contemplated based on the lighting requirements of the stand light 50. In some examples, the LEDs 112 are not in rows and columns, and are spaced apart generally equidistantly on the LED board 111. In yet other examples, the LEDs 112 can be tilted to project light in non-uniform directions relative to one another. Regardless of the LED 112 orientation, in operation, the LEDs 112 shine through the panel 113 (whether opaque or translucent) to illuminate a work area.

Referring back to FIGS. 1 and 2, the base 65 is connectable to a battery 90 (e.g., a battery pack) that is used to power the stand light 50. The battery 90 may be removable and rechargeable. For example, the battery 90 may be a power tool battery pack. In some embodiments, the battery 90 may be an 18 Volt Li-ion battery pack. In other embodiments, the battery 90 may have other voltages and/or chemistries. The base 65 also includes a power port 95, which can be used to power the stand light 50 via external power, charge the battery 90 via external power, and/or provide power to other devices (e.g., via an extension cord).

Figure 3B:
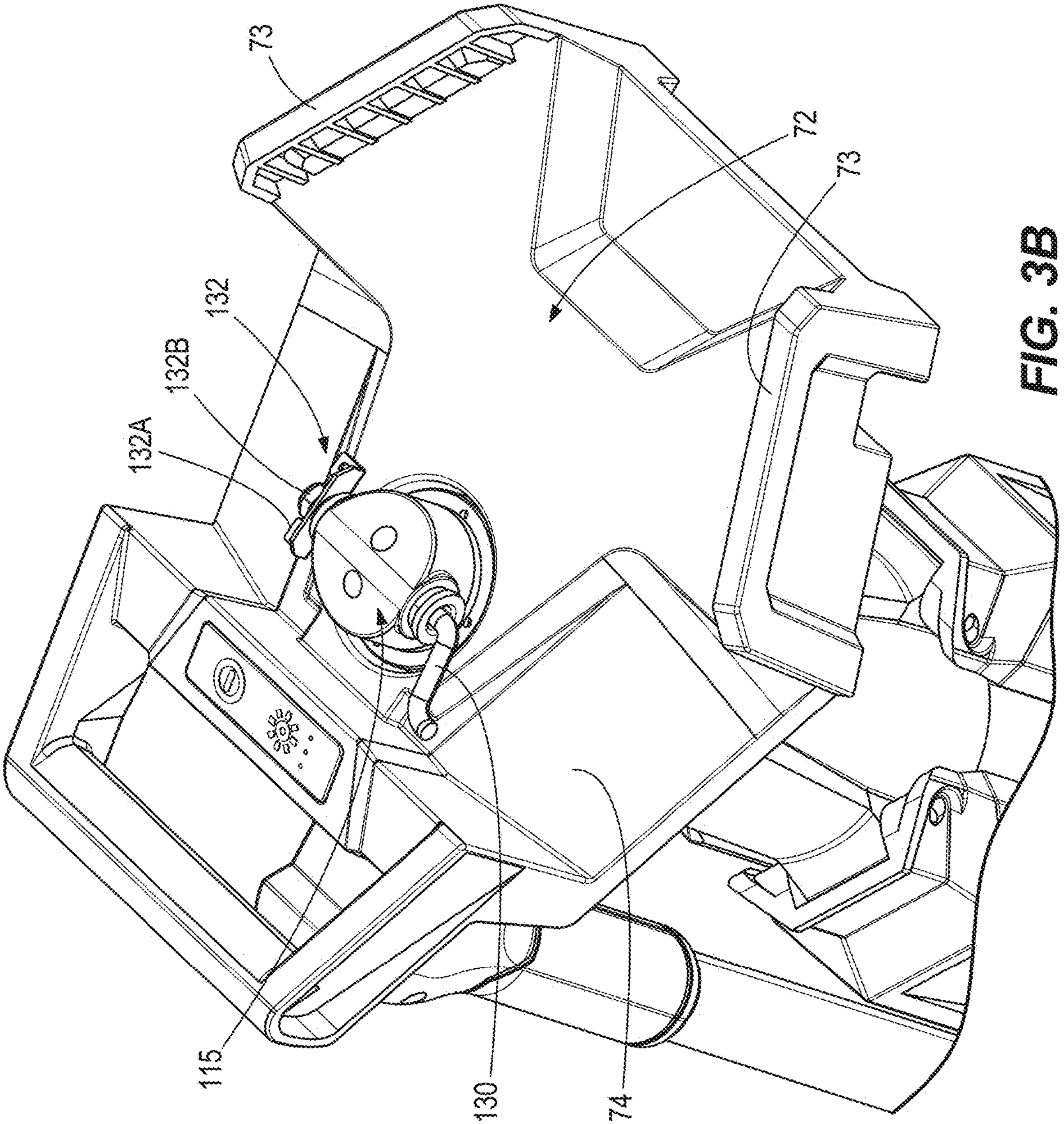
FIG. 3B illustrates a perspective view of the upper assembly of the stand light of FIG. 1 with a light head removed.

FIG. 3B illustrates a perspective view of an upper assembly of the stand light 50 with the light head 55 removed, and is generally the same view of the stand light 50 shown in FIG. 3A. FIG. 3B better illustrates the raised portions 73 and lower portion 74 of the upper assembly 82. Together, the raised portions 73 and the lower portion 74 form the channel 72 that receives the light head 55 when in the fully retracted position.

FIG. 3B also illustrates wiring 130 passing through the light head connection 115 where the wiring 130 connects to the light head 55. The wiring 130 provides power and electrical control to the light head 55. Opposite of where the wiring 130 passes through the light head connection 115, connecting hardware 132 is provided, and serves to physically connect the light head connection 115 to the light head 55. As illustrated, the connecting hardware 132 can include a bracket 132A and at least one fastener 132B. The bracket 132A is connected to the light head 55 and is rotatable around the fastener 132B to allow the light head 55 to rotate about the fastener 132B. In the embodiment shown herein, the wiring 130 passes into the first lobe 116, and the connecting hardware connects to the second lobe 117. This provides maximum clearance for the light head 55 to rotate about the light head connection 115, and limits kinking and bending of the wiring 130 caused by movement of the light head 55 relative to the light head connection 115. The location of the wiring 130 also contributes to the relatively thin design of the light head 55. In other examples, molded, rotatable connections can be employed to affix the light head 55 to the light head connection 115.

FIG. 4 illustrates the main handle 75 moved such that the legs 100 are in the extended position. The main handle 75 shown in FIG. 4 likewise includes a trigger 85 to release the legs 100 before being moved from the collapsed position to the extended position. In some examples, the legs 100 are locked into the extended position, and the trigger 85 (or actuator 87) is also depressed to release the legs 100 from the extended position to be moved back into the collapsed position.

Figure 5A:
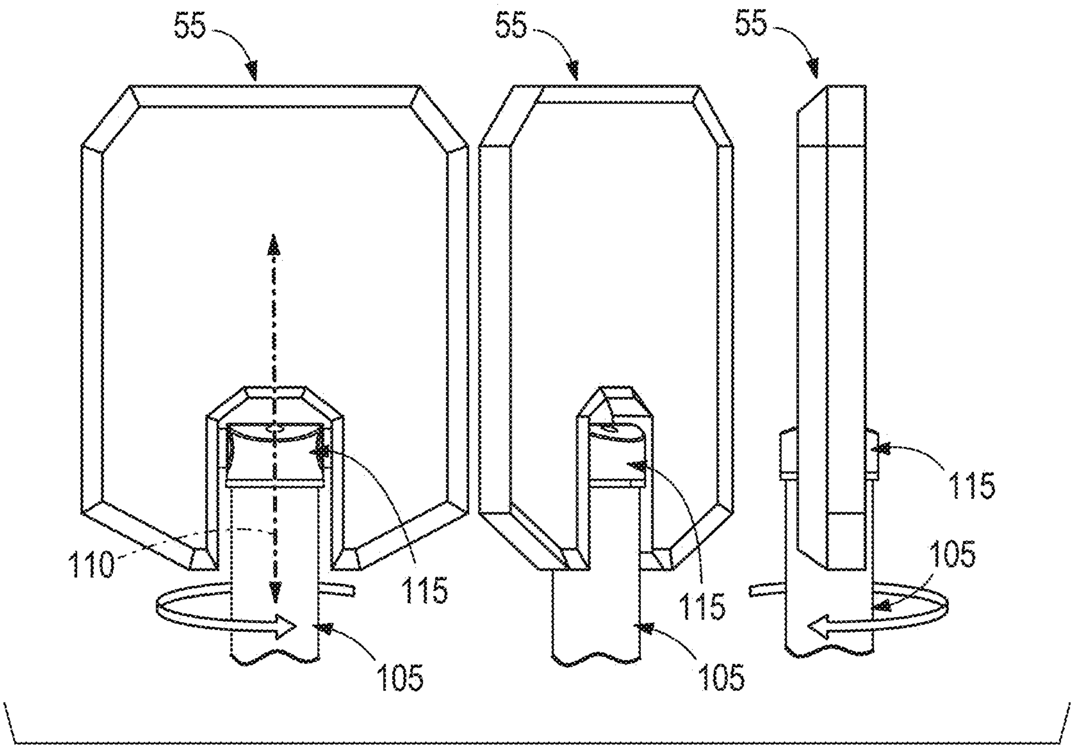
FIG. 5A illustrates a light head of the stand light of FIG. 1.
Figure 5B:
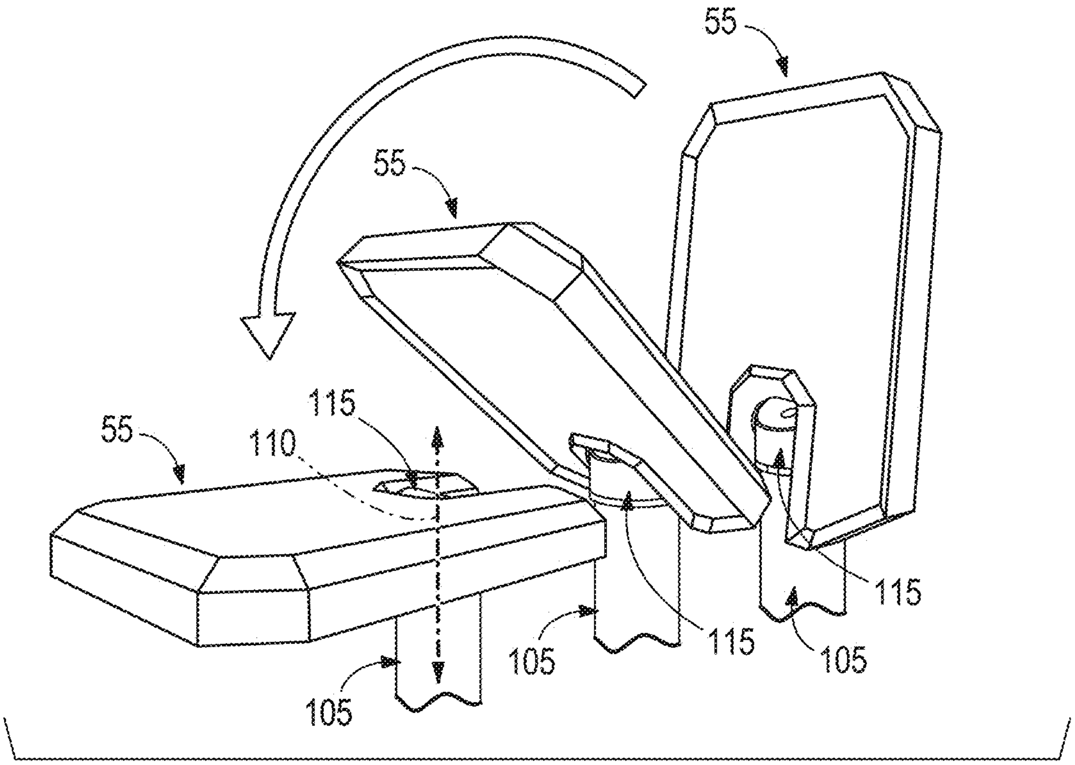
FIG. 5B illustrates the light head of the stand light of FIG. 1.

FIGS. 5A and 5B illustrate a light head connection 115, which connects the light head 55 with the uppermost extension pole 105. The light head connection 115 connects the light head 55 to the extension pole 105 so that, relative to the uppermost extension pole 105, the light head 55 is rotatable 360 degrees about the longitudinal axis 110 and is rotatable 180 degrees over the light head connection 115 (i.e., 90 degrees forward or backward from the longitudinal axis 110).

FIG. 6 illustrates the relative dimensions of the stand light 50 in the fully collapsed position at 50A, in a partially extended position at 50B with the legs 100 extended and supporting the stand light 50, and in a fully extended position at 50C with the legs 100 extended and the extension poles 105 fully extended. In positions 50B and 50C, the legs 100 hold the base 65 above the bottom-most extension of the legs 100, such that the base 65 is elevated above the ground when in positions 50B and 50C.

FIG. 6 also illustrates how each leg 100 includes a first end 103 hingedly coupled to the casing 107 and a second end 104 opposite the first end 103. The second end 104 of each leg 100 is movable between a collapsed position against the casing 107 (e.g., at position 50A) and an expanded position in which the second end 104 of each leg 100 is expanded apart from the casing 107 (e.g., at positions 50B and 50C). In embodiments including the slidable portion 86 (see FIGS. 1 and 2), the slidable portion 86 moves along the longitudinal axis 110 with the first end 103 as the legs 100 move from the collapsed position to the extended position.

FIG. 6 also illustrates, specifically in position 50A, how the stand light 50 is of a compact design compared to other products. The light head 55 via the light head connection 115 (i.e., hinge) folds to be relatively thin along the longitudinal axis 110. The body 60 includes extension poles 105, which in some embodiments do not include locking cams, as this functionality is replaced with friction fit connections, which are explained in more detail with reference to FIGS. 17-22. The base 65 is relatively compact, and the extension poles 105 are telescoping to minimize the overall length of the stand light 50 when the extension poles 105 are retracted into the protective casing 107.

Figure 7A:
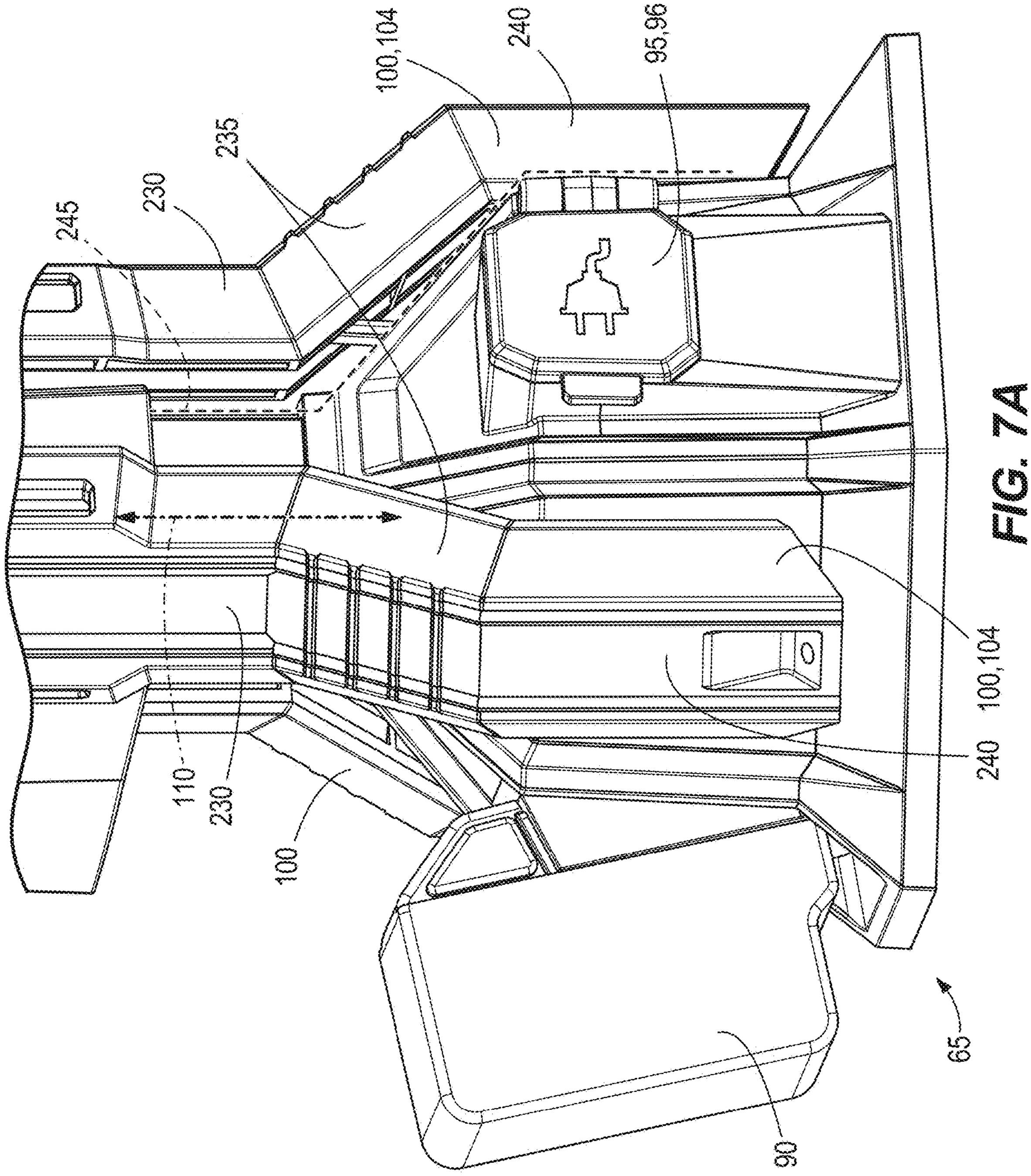
FIG. 7A illustrates a detail view of a base of the stand light of FIG. 1.

FIG. 7A illustrates a detail view of the base 65 of the stand light 50 and, in particular, illustrates the second end 104 of each of the legs 100. Each of the legs 100 includes a main portion 230 that represents most of the overall length of the leg 100 and, in the collapsed position, extends generally parallel to the longitudinal axis 110. Near the second end of the legs 100, an offset portion 235 of the leg 100 is provided, which extends orthogonally from the main portion 230 and connects the main portion 230 to a foot portion 240. When the legs 100 are in the extended position, the foot portion 240 contacts the ground. When the legs 100 are in the collapsed position, the base 65 contacts the ground and the legs 100 are suspended above the ground. Together the main portion 230, offset portion 235, and foot portion 240 follow a contour 245 (indicated by the dashed line) of the base 65. By adapting the legs 100 to follow the contour 245, the stand light 50 in the collapsed position is tightly packaged against the base 65 and is therefore more easily transported by a user. The foot portions 240 of the legs 100 in the collapsed position are spaced about the base 65 so that a user can access the battery 90 (e.g., so that a user can replace the battery 90 when the stand light 50 is in the collapsed position) and the power port 95, shown behind a cover 96 herein (e.g., so that a user can access the power port 95 when the stand light 50 is in the collapsed position).

Figure 7B:
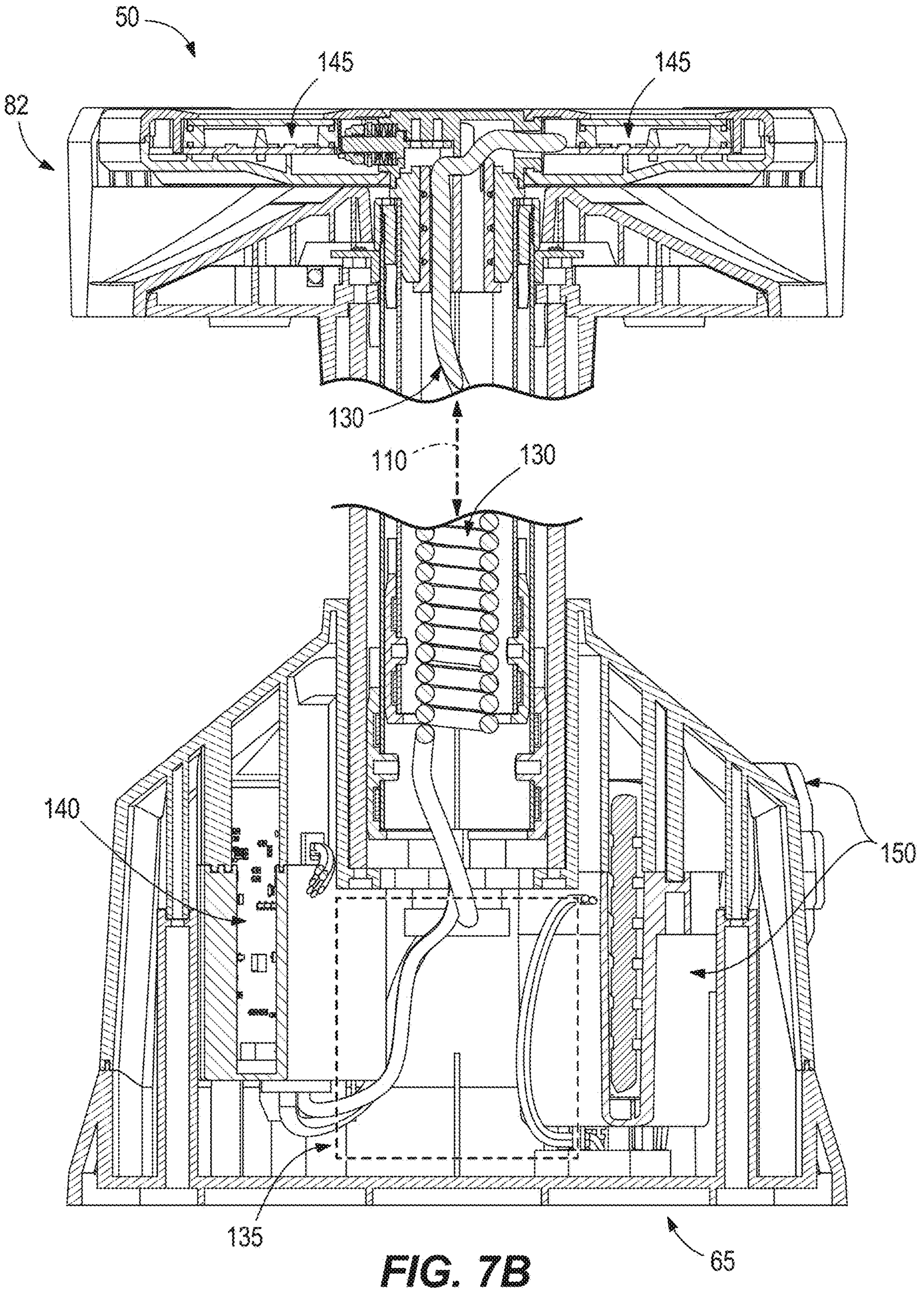
FIG. 7B illustrates a section view of portions of the stand light of FIG. 1.

FIG. 7B illustrates the relative location of major internal components of the stand light 50. The light head 55 includes light emitting diode (LED) assemblies 145 (including, e.g., individual LEDs 112 and an LED board 111), which are connected via the wiring 130 to components in the base 65. The wiring 130 extends through the extension poles 105. In other embodiments, the wiring 130 may be external to the extension poles 105. The base 65 includes PCBs 140, a battery terminal 135 (for receiving the battery 90), and AC port components 150 (e.g., the power port 95). The battery terminal 135 is shown schematically with a dashed box, as the section view of FIG. 7B obscures much of the structure of the battery terminal 135.

Figure 7C:
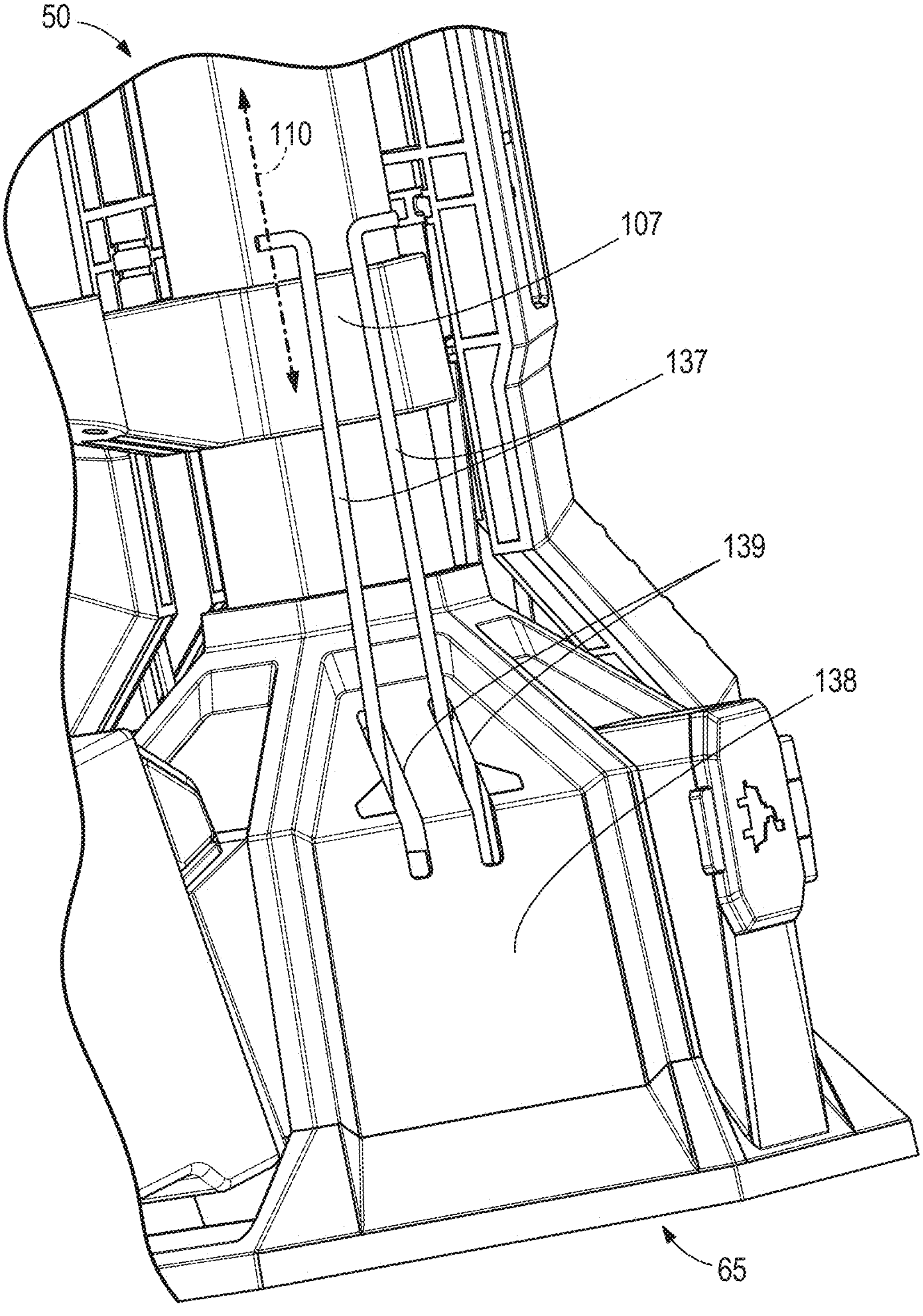
FIG. 7C illustrates another detail view of the base of the stand light of FIG. 1 with the legs removed.

FIG. 7C illustrates a view of the base 65 of the stand light 50 with the legs 100 removed to better illustrate leg links 137 (also visible in FIG. 6). The leg links 137 connect the base 65 to the legs 100, and are rotatable from the position shown in FIG. 7C extending generally along the longitudinal axis 110 to the position shown in FIG. 6 in which the leg links 137 extend orthogonal to the longitudinal axis 110. The leg links 137 serve to limit the extension of the second end 104 of the legs 100 away from the casing 107, thus providing the ability for the stand light 50 to rest with the base 65 above the ground as shown at 50B and 50C in FIG. 6. To connect to the base 65, the leg links 137 pass through slots 139 in a cover 138 of the base 65. The slots 139 are elongated and provide clearance for the leg links 137 as the leg links 137 rotate with the legs 100 between the extended and retracted positions. In some examples, the leg links 137 are formed from a single piece of material, for example steel, in a U-shape with the base of the U-shape connecting to the base 65.

Figure 8:
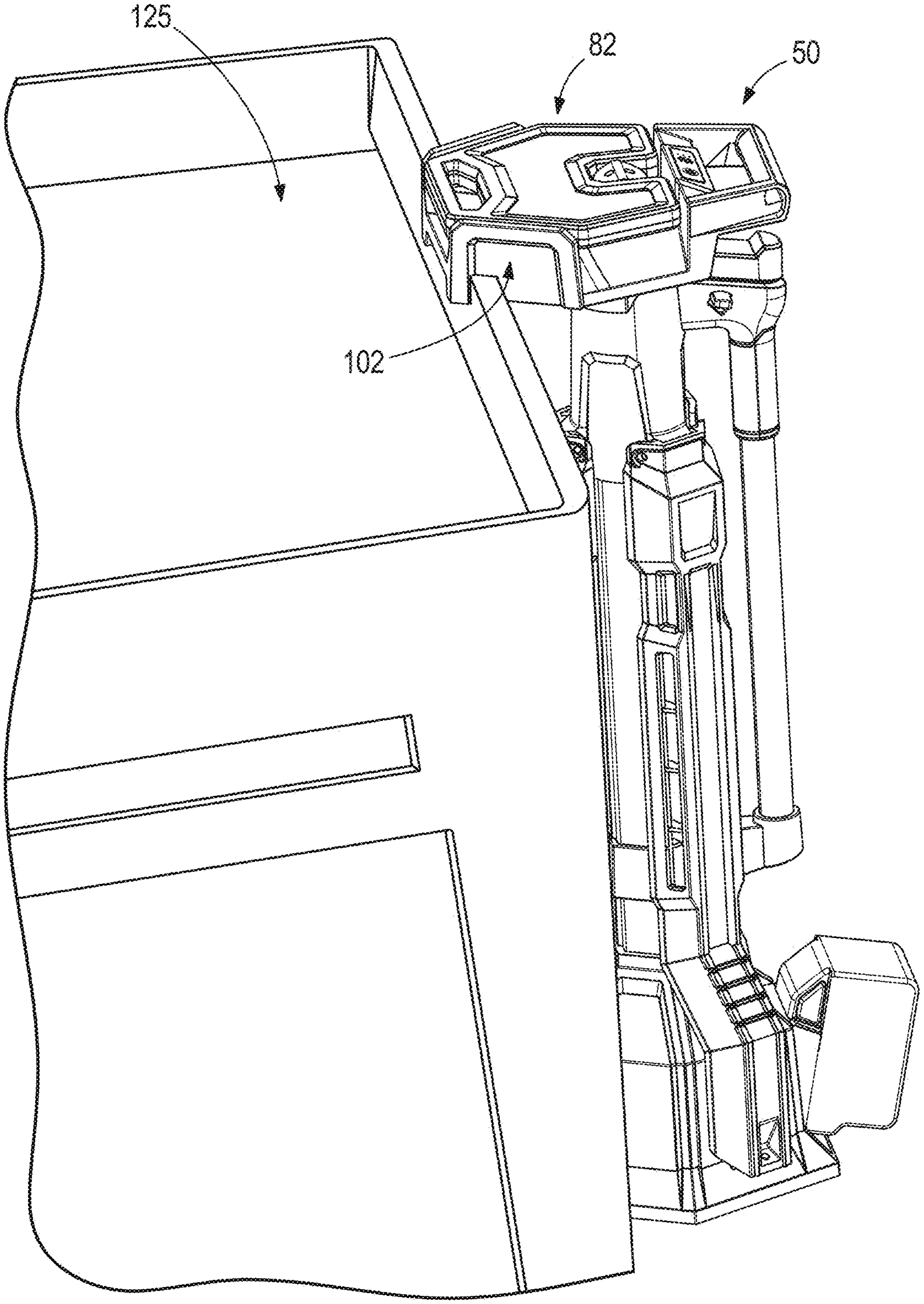
FIG. 8 illustrates the stand light of FIG. 1 attached to a cart.

In some embodiments, the stand light 50 may be integrated as part of a component of the PACKOUT storage system sold by Milwaukee Tool. For example, FIG. 8 illustrates how the protrusions 102 of the upper assembly 82 are configured to hook onto a cart 125 so that the stand light 50 can be carried to and from a jobsite using the cart 125. As shown in FIGS. 1-3, the protrusions 102 are on an opposite side of the upper assembly 82 relative to the secondary handle 80. The weight of the stand light 50 keeps the protrusions 102 engaged to the cart 125, and thus, in such an embodiment no additional connecting structure may be required.

Figure 9B:
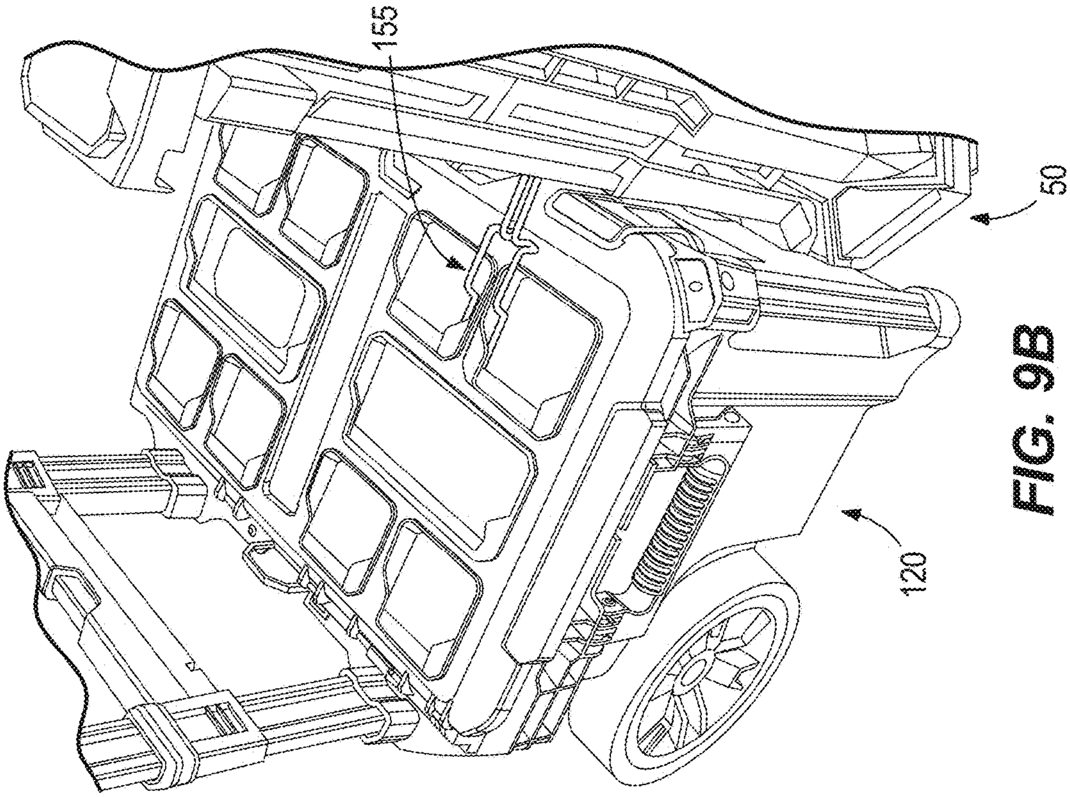
FIG. 9B illustrates another view of the stand light of FIG. 1 attached to the storage box.
Figure 9A:
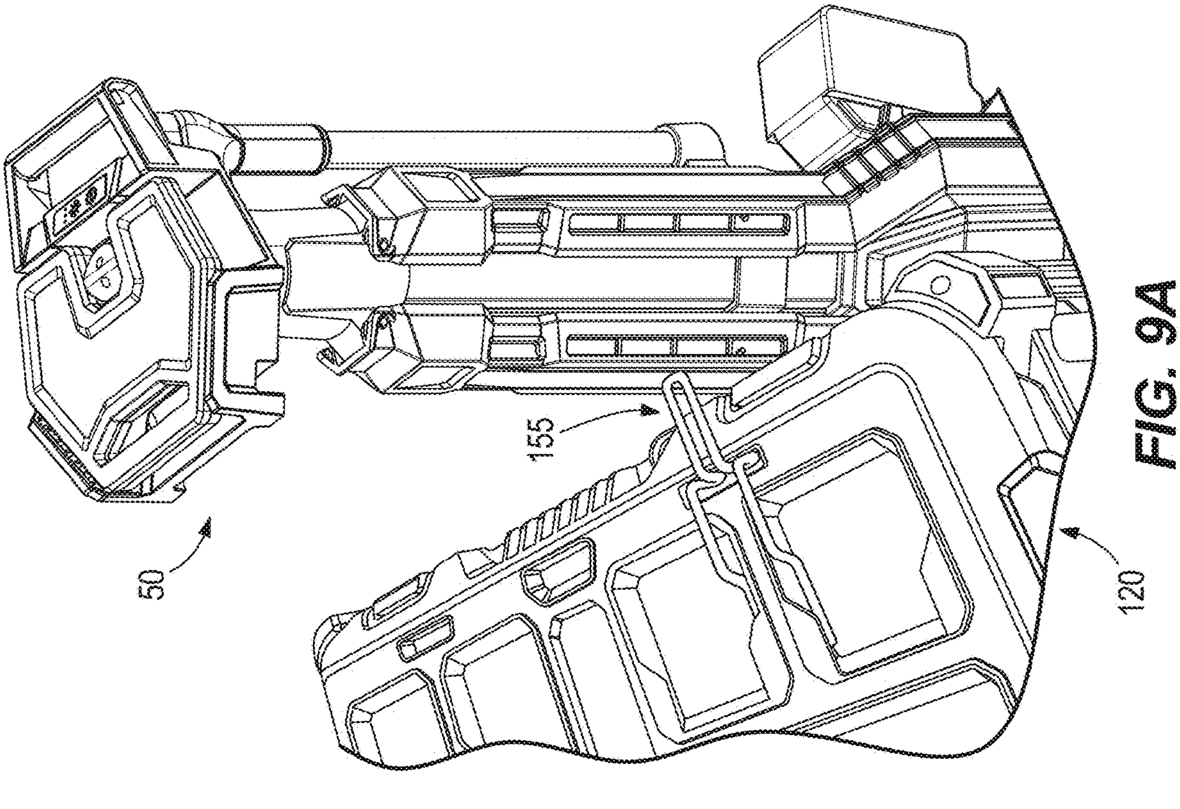
FIG. 9A illustrates the stand light of FIG. 1 attached to a storage box.
Figure 10:
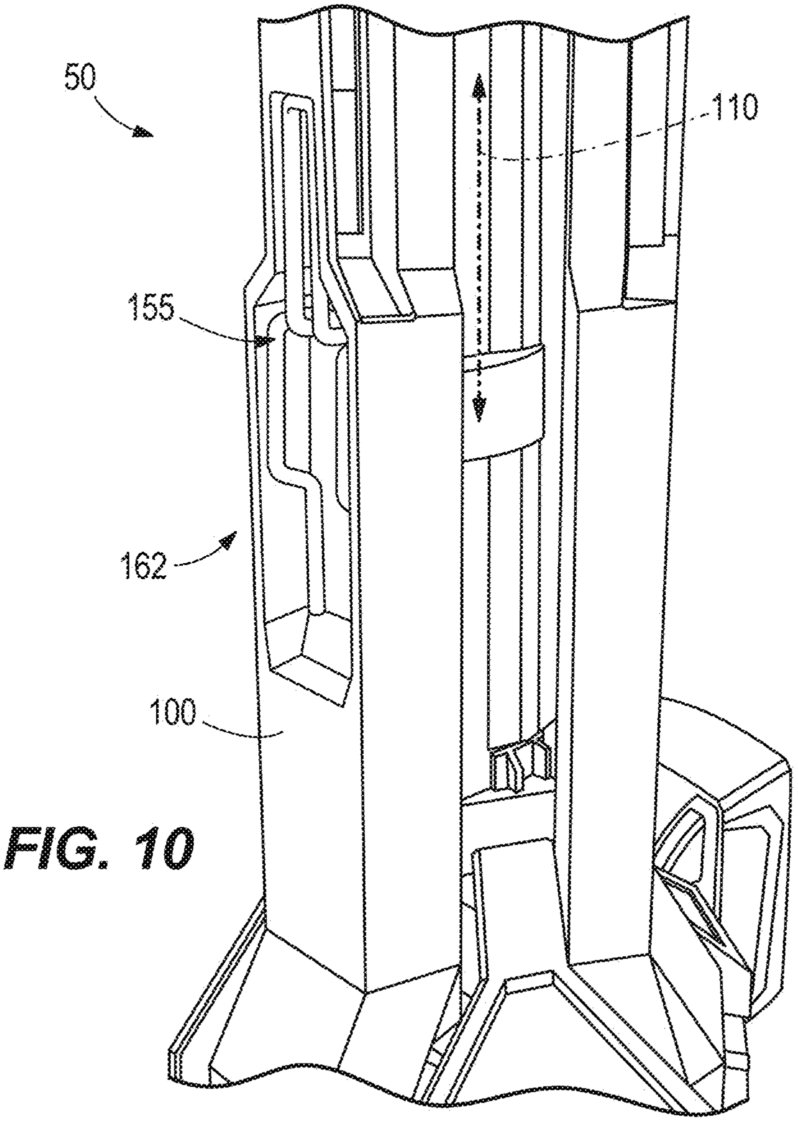
FIG. 10 illustrates a fork of the stand light of FIG. 1.
Figure 11:
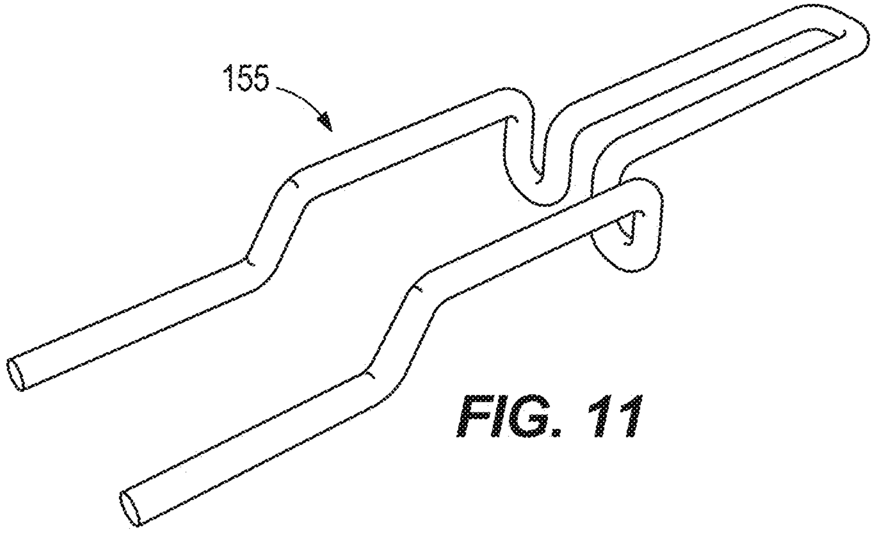
FIG. 11 illustrates an isometric view of the fork of FIG. 10.

FIGS. 9A and 9B illustrate a fork 155 that may be connected to one of the legs 100 of the stand light 50. The fork 155 is shown without any obstructing structure in FIG. 11. The fork 155 is connectable to a support structure 120 such as a PACKOUT box of a PACKOUT storage system sold by Milwaukee Tool, such that the stand light 50 can be carried to a jobsite using the support structure 120. As shown by contrasting FIG. 9A and FIG. 10, the fork 155 rotates out from a nested position within a cavity 162 of the leg 100. The fork 155 is generally aligned with the longitudinal axis 110 when nested within the cavity 162. When the fork 155 is rotated away from the leg 100 (i.e., in a position generally perpendicular to the longitudinal axis 110), the fork 155 is adapted to lock into a support structure 120. The support structure 120 may be, for example, configured to hold other tools required on a jobsite.

Figure 12:
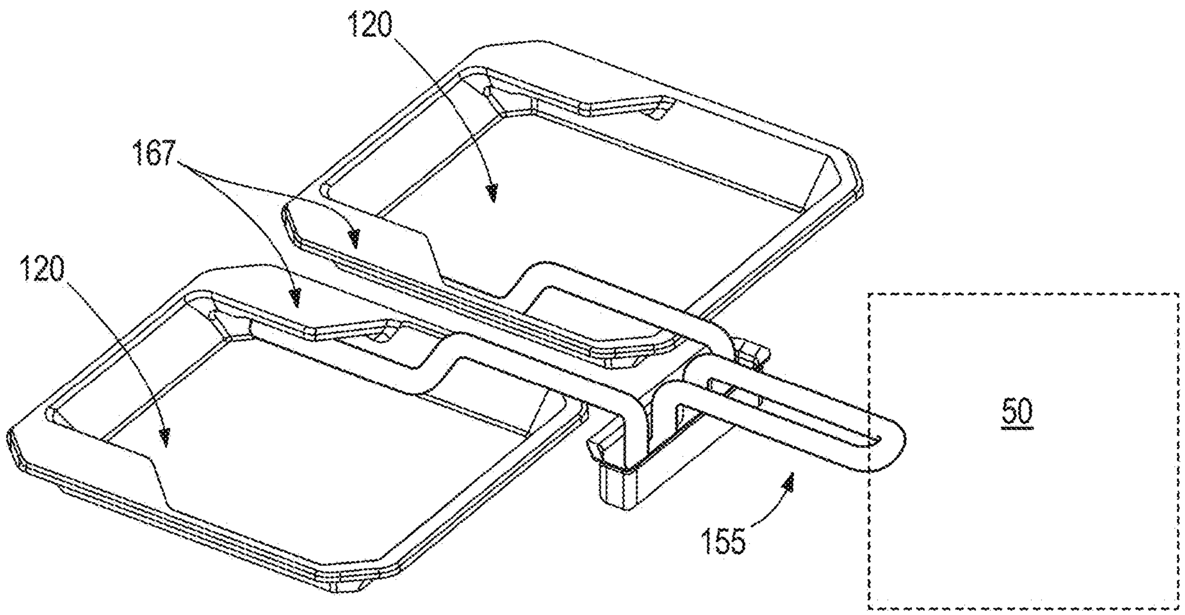
FIG. 12 illustrates another isometric view of the fork of FIG. 10 interfacing with cleats of the storage box.
Figure 13:
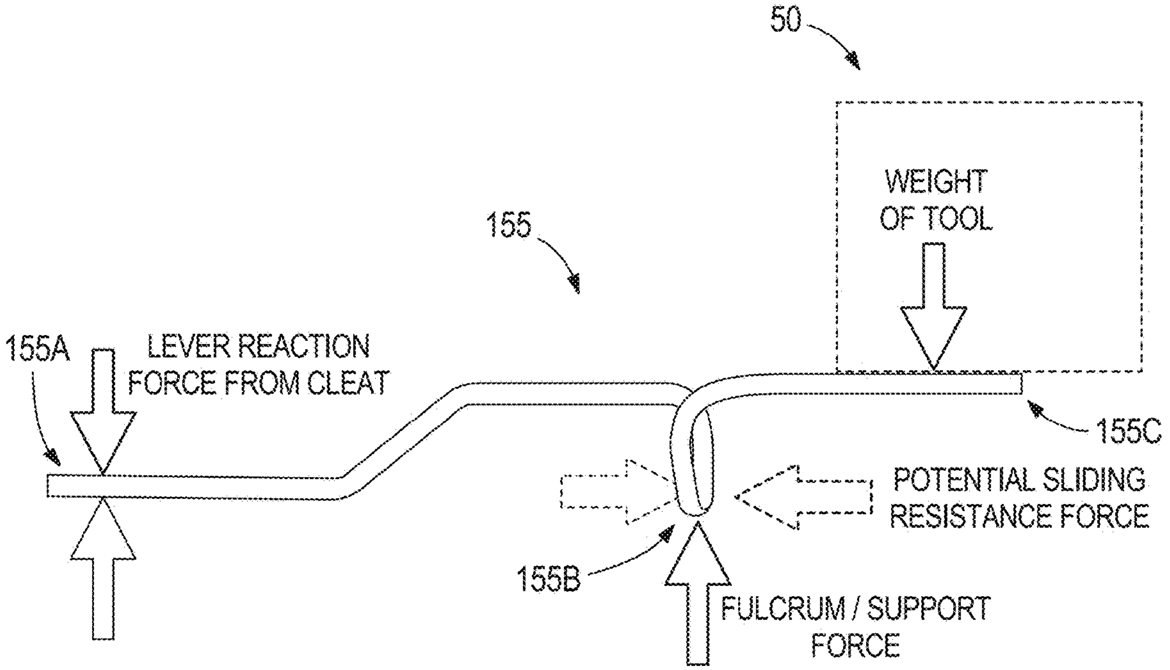
FIG. 13 illustrates a side view of the fork of FIG. 10.

FIGS. 12 and 13 illustrate how the fork 155 attaches to the support structure 120. The fork 155 includes a lever portion 155A at one extreme end of the fork 155, and an attachment portion 155C at the other extreme end of the fork 155. A fulcrum 155B is positioned between the lever portion 155A and the attachment portion 155C. The support structure 120 includes cleats 167, which are adapted to receive the lever portion 155A. The attachment portion 155C connects to the stand light 50. The weight of the stand light 50 acts on the attachment portion 155C to rotate the fork 155 about the fulcrum 155B, thus retaining the lever portion 155A underneath the cleats 167 of the support structure 120. If the weight of the stand light 50 is released (e.g., by a user of the stand light 50 pulling up on the stand light 50), the fork 155 is released from the support structure 120 so that the stand light 50 can be used by the user. The fork 155 is shown as being solid metal, but in other examples can be injection molded plastic or a metal casting.

Figure 14:
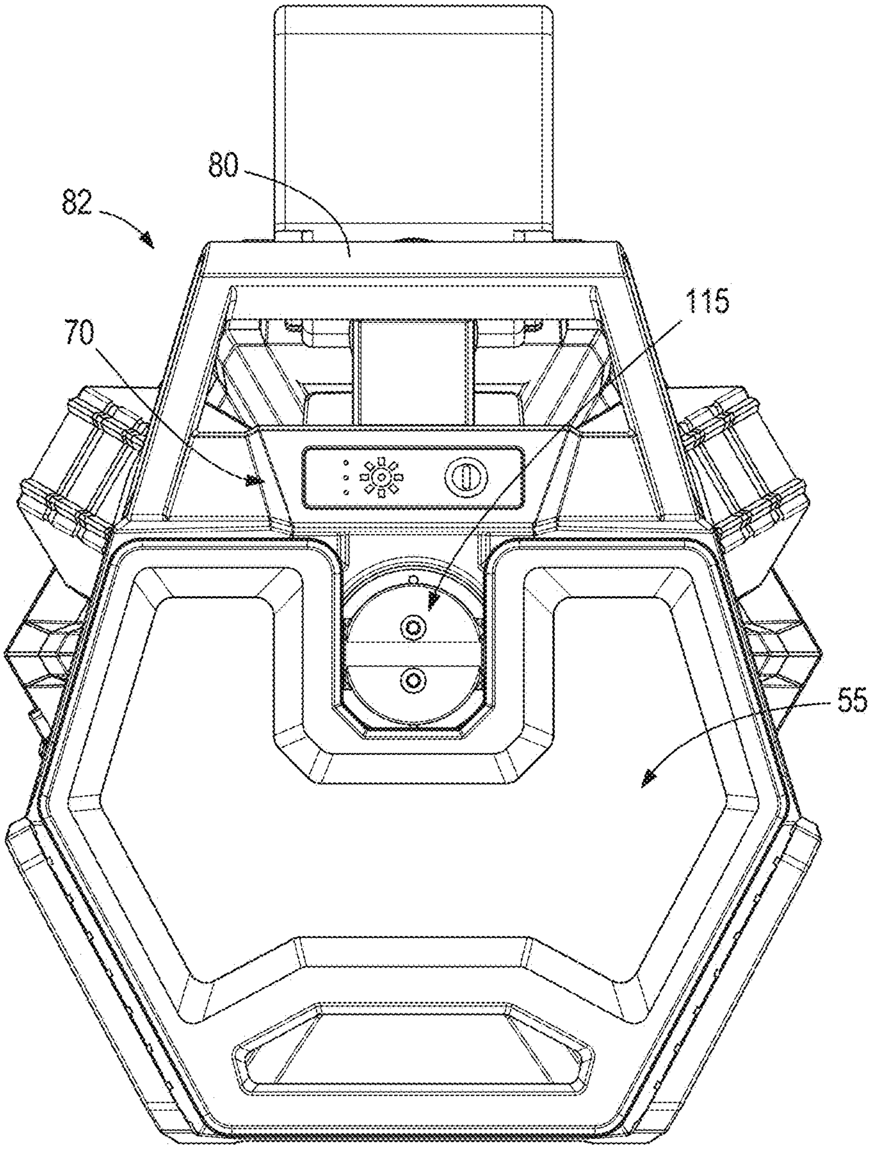
FIG. 14 illustrates a top-down view of the upper assembly of the stand light of FIG. 1.

FIG. 14 illustrates the UI panel 70 in greater detail on the upper assembly 82 and shows the relative location of the UI panel 70 relative to the light head 55 and the secondary handle 80. The particular buttons on the UI panel 70 are explained in more detail with reference to FIGS. 15 and 16.

Figure 15:
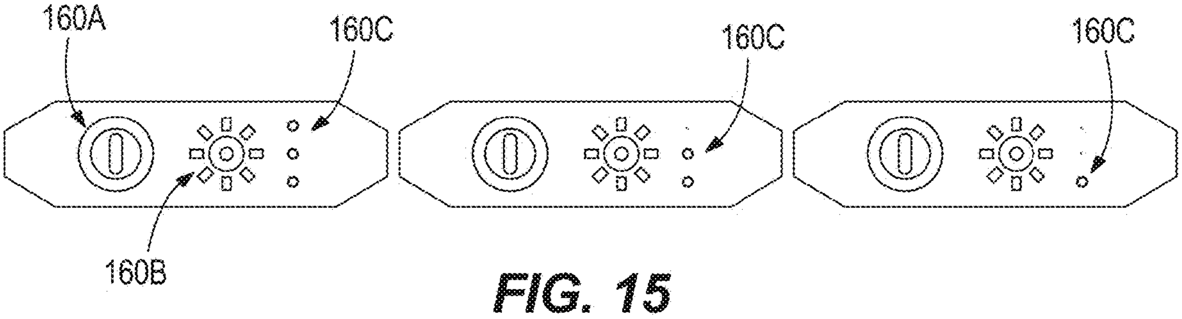
FIG. 15 illustrates various configurations of a UI panel of the stand light of FIG. 1.
Figure 16:
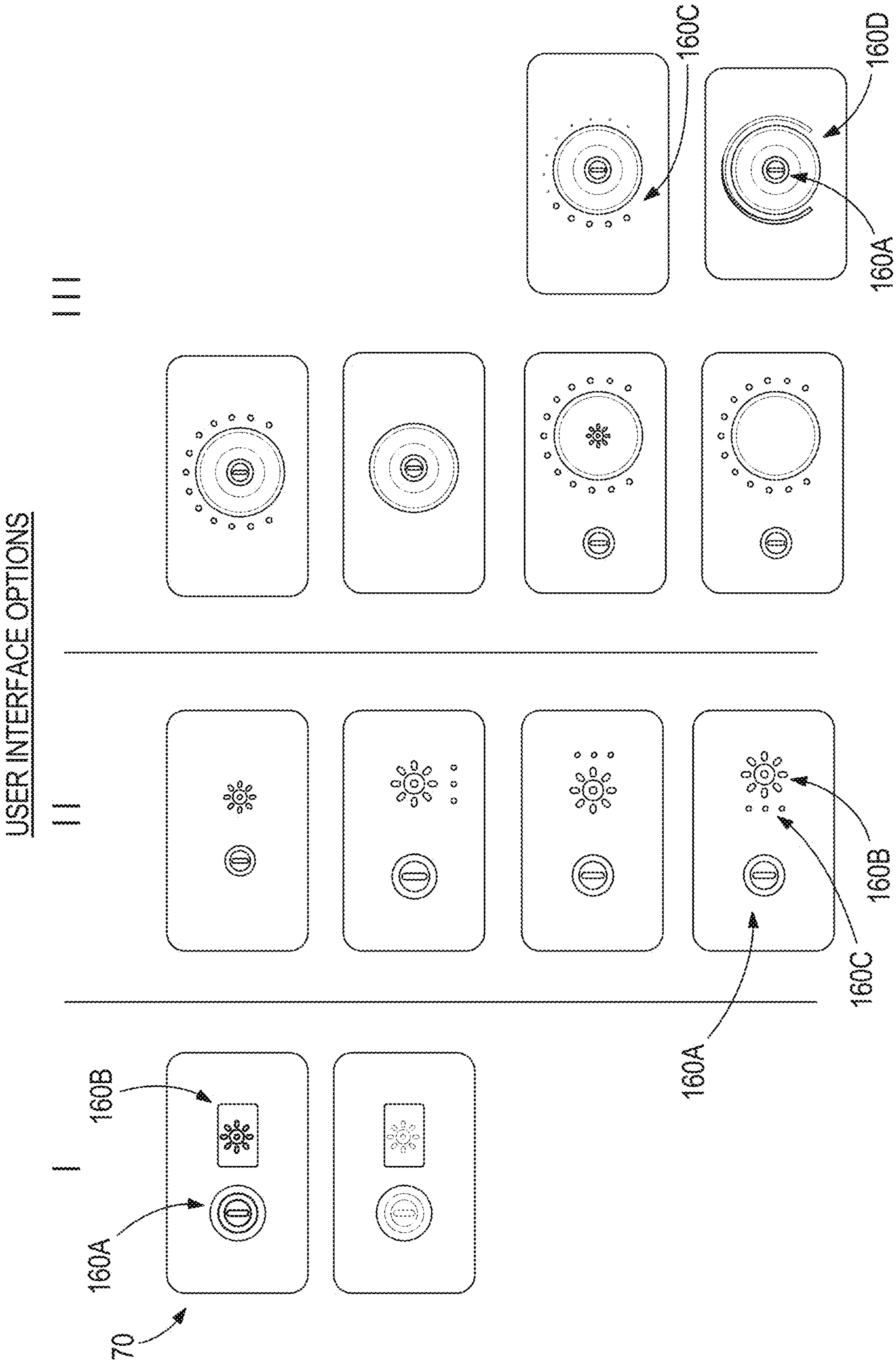
FIG. 16 illustrates additional configurations of the UI panel of the stand light of FIG. 1.

FIGS. 15 and 16 illustrate various configurations of the UI panel 70. In general, the UI panel 70 includes one or more buttons, one or more LEDs, and an overmold covering the buttons and the LEDs. FIG. 15 illustrates an example of the UI panel 70, and more specifically illustrates the difference between the pin LEDs 160C when the stand light 50 is outputting the various light intensity levels. In the example shown in FIG. 15, high light intensity is indicated by illuminating three pin LEDs 160C, a medium light intensity level is indicated by illuminating two pin LEDs 160C, and a low light intensity level is indicated by illuminating a single pin LED 160C.

With reference to FIG. 16, reference numerals are not provided on every button to reduce clutter in the figures, however, buttons with similar icons shown in the various embodiments should be interpreted to have the same or similar functionality. In the examples shown in column I, the UI panel 70 includes a power button 160A and an intensity button 160B. The power button 160A turns the stand light 50 on or off, while the intensity button 160B adjusts light intensity level of the stand light 50. The buttons are rubber and the icons on the buttons are pad printed and/or are debossed. Column II illustrates another set of exemplary UI panels 70 that also include the power button 160A and the intensity button 160B. Also included are pin LEDs 160C like those shown in FIG. 15. The pin LEDs 160C operate to illustrate the current light intensity level by illuminating a number of the pin LEDs 160C that corresponds to a given light intensity level. The buttons shown in the UI panels 70 shown in column II are covered by a single or shared overmold and are part of an embossed pad with printed buttons.

Column III illustrates another set of UI panels 70, with a key difference from the UI panels 70 shown in columns I and II being that the power button 160A is a rotatable dial, such that the power button 160A can be depressed to turn the stand light 50 on or off. The power button 160A can also be rotated to adjust the light intensity level. The power button 160A is clickable, such that the entire power button 160A can be pressed to turn the stand light 50 on or off. In some examples, pin LEDs 160C indicate relative brightness levels, while in other examples, relative brightness levels are shown via an LED array 160D that progressively illuminates over the array to indicate a light intensity level. The power button 160A can also include detents, which give the user tactile feedback while the power button 160A is rotated. Like the buttons shown in column II, the non-rotatable buttons and the LEDS of the UI panel 70 shown in column III are covered by a single or shared overmold and are part of an embossed pad with printed buttons. The rotatable buttons of the UI panel 70 shown in column III may be covered by a separate overmold or may be a separate component.

Referring back to FIG. 6, position 50C illustrates the extension poles 105 of the stand light 50 in a fully extended position. To achieve this, the stand light 50 includes a number of components therein that make up a friction fit system 98 as shown in FIGS. 17-30. The friction fit systems 98 shown and described herein can reduce or eliminate cam locks and other locking structure that can be included on similar stand lights 50 to retain the extension poles 105 in position relative to one another and relative to the protective casing 107. Such friction fit systems 98 can be advantageous when using the stand light 50 because of the simplicity to the user—the light head 55 of the stand light 50 can be adjusted to a position without the need for an additional locking step to maintain the light head 55 in a position, and instead, the light head 55 will simply remain where it is placed.

Figure 17:
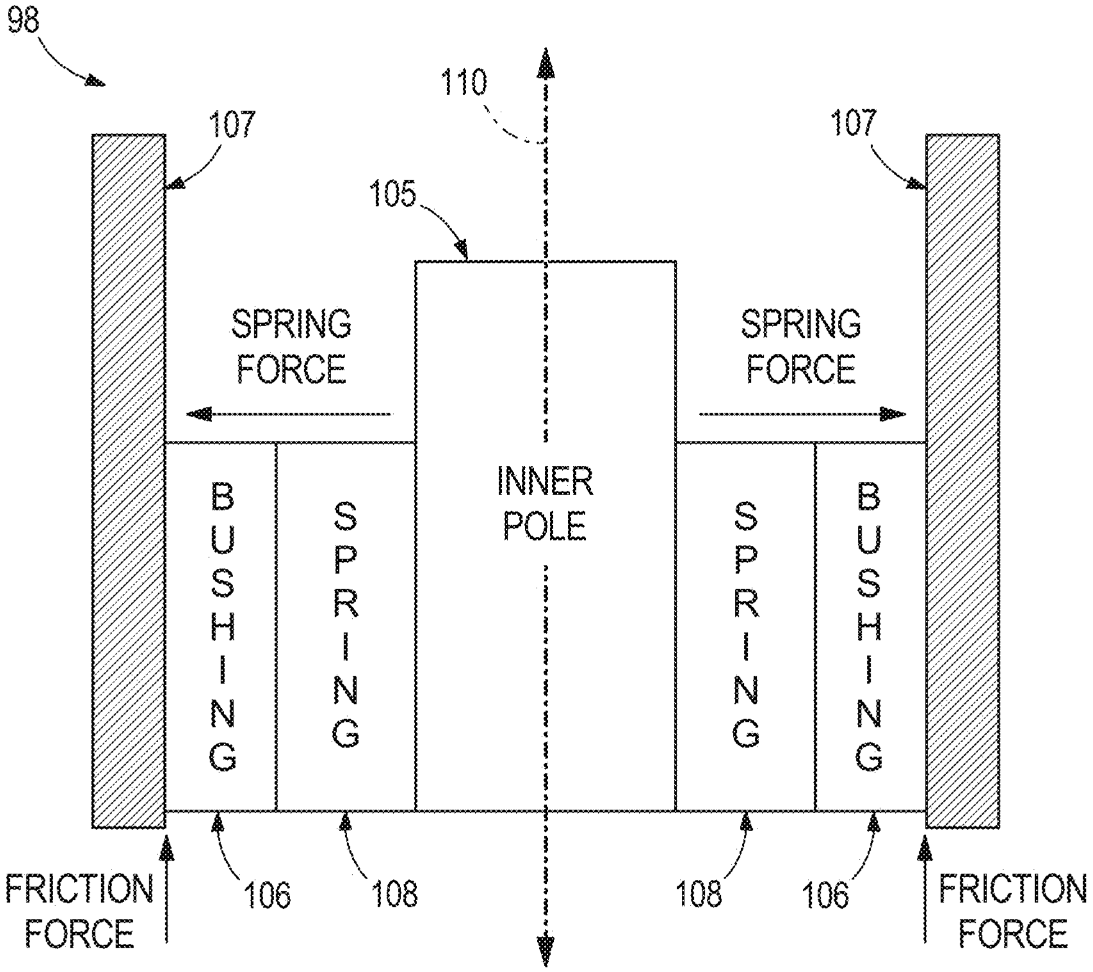
FIG. 17 illustrates a schematic section view of a portion of the stand light of FIG. 1 and illustrates an exemplary friction fit system.

FIG. 17 illustrates a schematic example of a friction fit system 98. The friction fit system 98 includes an extension pole 105 positioned within a casing 107 such that the extension pole 105 is slidable into and out of the protective casing 107 along the longitudinal axis 110. In other examples, a similar configuration to that of FIG. 17 is used between adjacent extension poles 105. A bushing 106 and a spring 108 are positioned between the extension pole 105 and the casing 107 such that the spring 108 acts on the extension pole 105 to push the bushing 106 radially away from the extension pole 105, thus also biasing the bushing 106 radially away from the longitudinal axis 110. This spring force is indicated by arrows in FIG. 17. In pushing the bushing 106 away from the extension pole 105, the bushing 106 contacts the casing 107 creating a frictional force between the busing and the protective casing. The spring 108 is fixed to the extension pole 105, and thus the frictional force acts to fix or hold the extension pole 105 relative to the casing 107. The frictional force of the spring 108 is strong enough to support the light head 55, but not so strong that it is difficult for a user to overcome the frictional force to move the extension pole 105 (and light head 55 attached thereto) relative to the casing 107. This frictional force is indicated by arrows in FIG. 17.

In some examples, numerous bushings 106 with corresponding springs 108 are spaced radially about the extension pole 105, which is generally cylindrical, and thus the bushings 106 with corresponding springs 108 can be spaced equally around the generally circular cross-section of the extension pole 105. For example, two bushings 106 and corresponding springs 108 can be located on opposite sides of the extension pole 105 across the longitudinal axis 110. In other examples, three, four, five, six, or more bushings 106 and corresponding springs 108 can be spaced radially about the extension pole 105.

Figure 18:
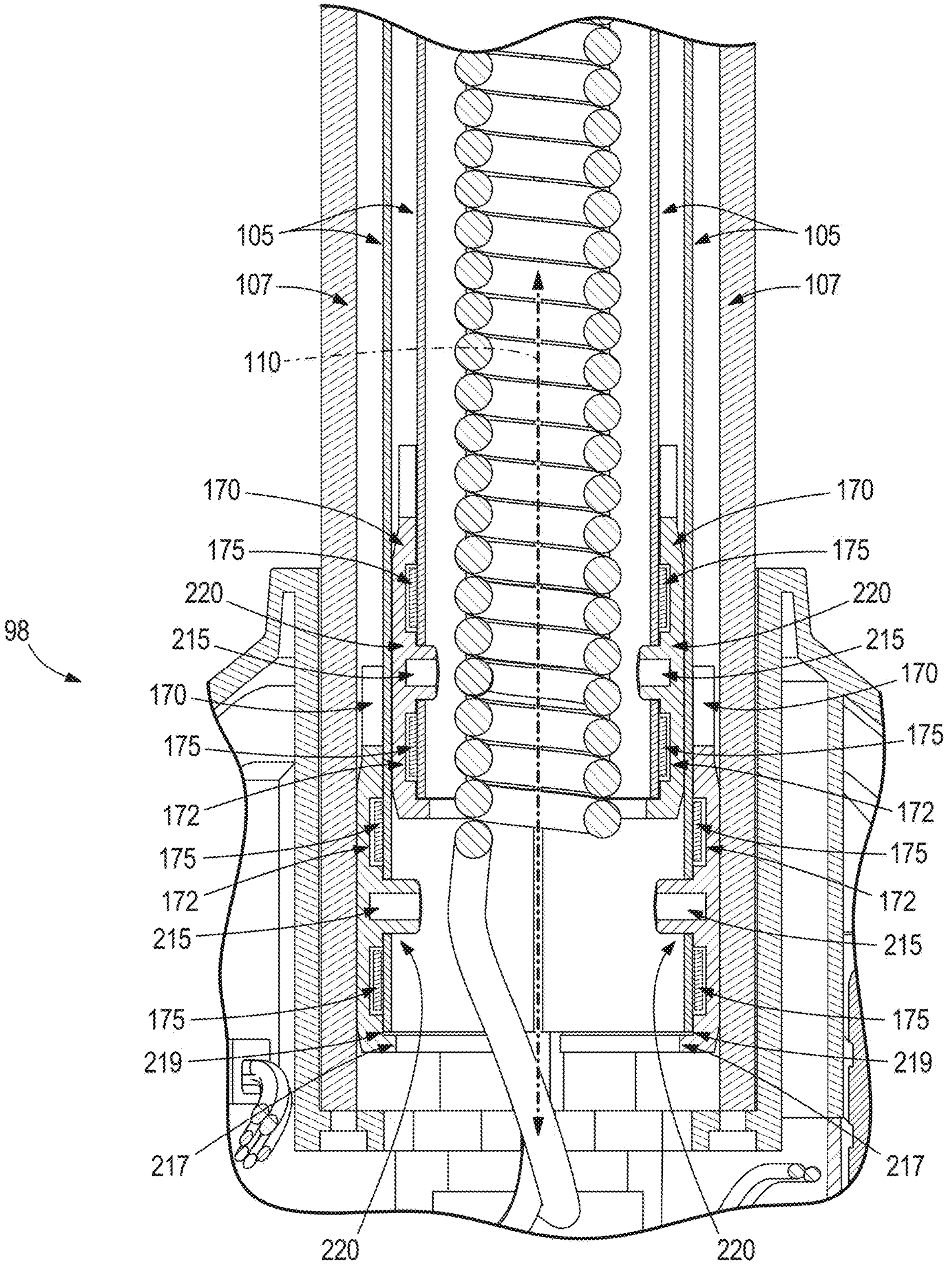
FIG. 18 illustrates another section view of a portion of the stand light of FIG. 1 and illustrates an exemplary friction fit system.
Figure 19A:
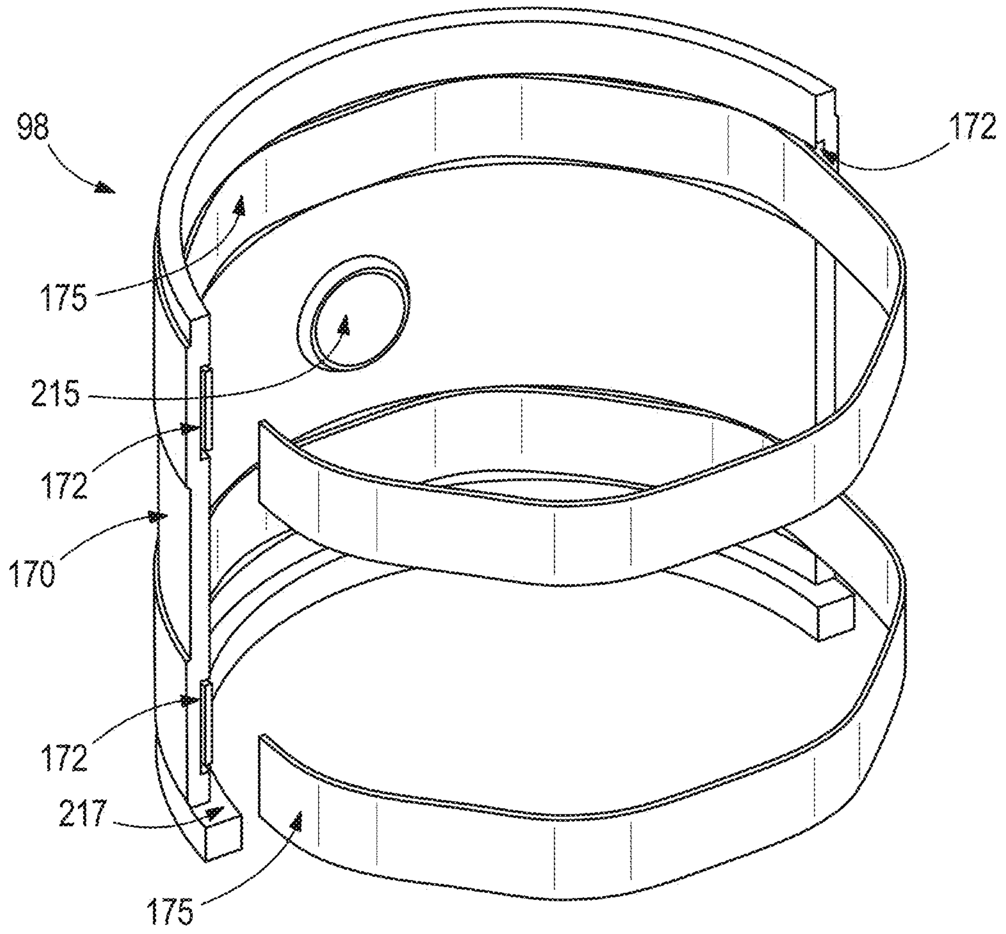
FIG. 19A illustrates a bushing and a spring of the stand light of FIG. 1.
Figure 19B:
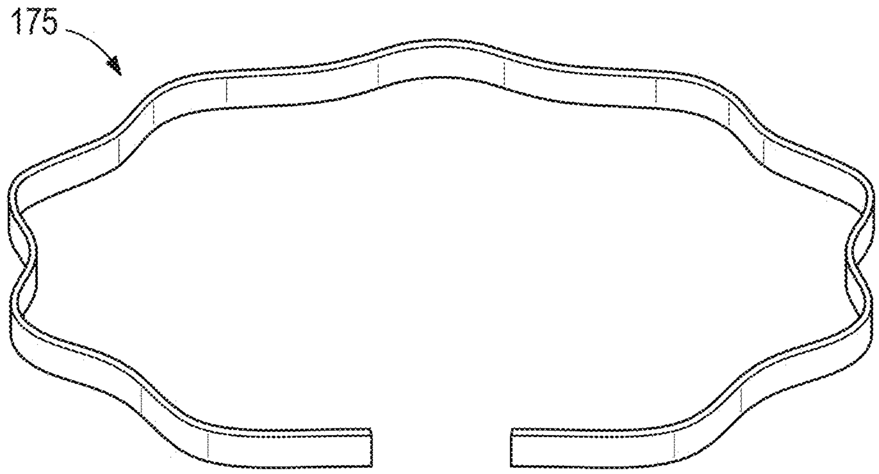
FIG. 19B illustrates the spring of the stand light of FIG. 1.

FIGS. 18 and 19A illustrate an example of a friction fit system 98. In this example, the friction fit system 98 includes a bushing 170 (also referred to as a wear sleeve or shim) and a spring 175. In some examples, the spring 175 is a Marcel expander. Marcel expanders are wave-shaped, annular springs that can be seated within respective cavities 172 within the interior circumference of the bushing 170. To reduce clutter in FIG. 18, not all of the cavities 172 are labeled. The spring 175 is shown in FIG. 19B without any surrounding structure. In some examples, the spring 175 is metal, but in some examples is formed from other materials. Referring back to FIG. 18, the spring 175 is shown including a wavelike circumference that, when seated within the bushing 170 and between two adjacent extension poles 105, pushes radially outward relative to the longitudinal axis 110. This radial force causes the bushing 170 to expand into the extension pole 105 extending around the bushing 170, thereby creating friction between the adjacent extension poles 105 between which the bushing 170 and the spring 175 are positioned.

As shown in FIG. 18, two extension poles 105 are provided, which are telescopically received within the protective casing 107. Thus, two bushings 170 are provided, one between the protective casing 107 and the first, outer extension pole 105, and a second between the first, outer extension pole 105 and the second, inner extension pole 105. Two springs 175 are provided with each bushing 170, although in other embodiments more or fewer springs 175 can be provided with each bushing 170. In the examples shown herein, the bushing 170 is affixed to an extension pole 105, and is expanded radially outward via the spring(s) 175 to cause friction against an adjacent extension pole 105 or the protective casing 107. To affix the bushing 170 in the correct position relative to the extension pole 105 on which it is installed, the bushing 170 includes a post 215 and a lip 217. The post 215 is best shown in FIG. 19A. As shown in FIG. 19B, the post 215 extends through an aperture 220 in the extension pole 105, such that the bushing 170 cannot move relative to the extension pole 105 to which the bushing 170 is affixed. Due to high frictional forces between the bushing 170 and the extension poles 105, a lip 217 may be provided to provide additional security in the connection between the bushing 170 and the extension pole 105 to which the bushing 170 is affixed. The lip 217 extends beyond an end 219 of the extension pole 105 and then radially inward toward the longitudinal axis 110 over the end 219 of the extension pole 105. Thus, when the extension pole 105 is forced back into the nested, collapsed position (e.g., when changing the stand light 50 from position 50C back into position 50A), the lip 217 engages the end 219 of the extension pole 105 so that the bushing 170 remains seated in the correct position along the extension pole 105.

Figure 20:
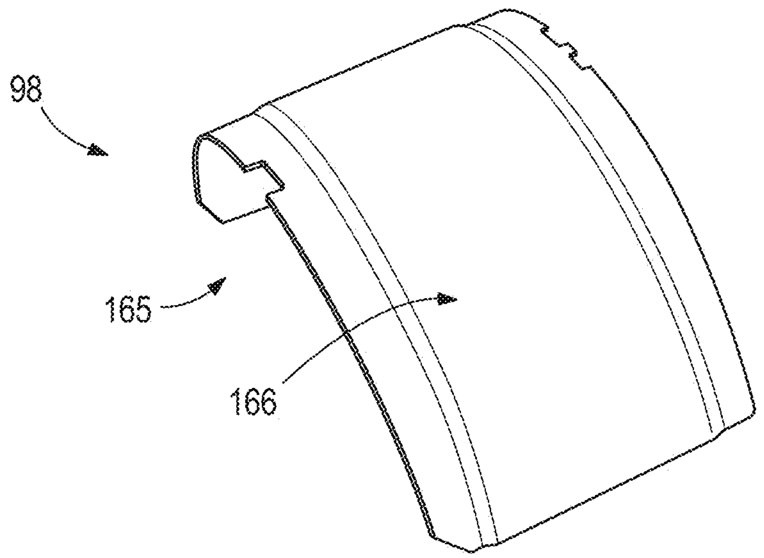
FIG. 20 illustrates another example of a friction fit system for use with the stand light of FIG. 1.

FIG. 20 illustrates an alternative friction fit system 98 for retaining the extension poles 105 in place in the extended position, and illustrates a friction bushing 165 formed from plastic. The friction bushing 165 is positioned between adjacent extension poles 105 and includes portions (such as bump out 166) that are thicker than the spacing between the adjacent extension poles 105. Due to the friction bushing 165 (or at least portions thereof) being wider than the space in which the friction bushing 165 is positioned, the friction bushing 165 creates friction that retains the extension poles 105 in position relative to one another. However, the friction bushing 165 is not too big so as to create too much friction, as a user should be able to overcome the friction created by the friction bushing 165 to extend and retract the extension poles 105.

Figure 21A:
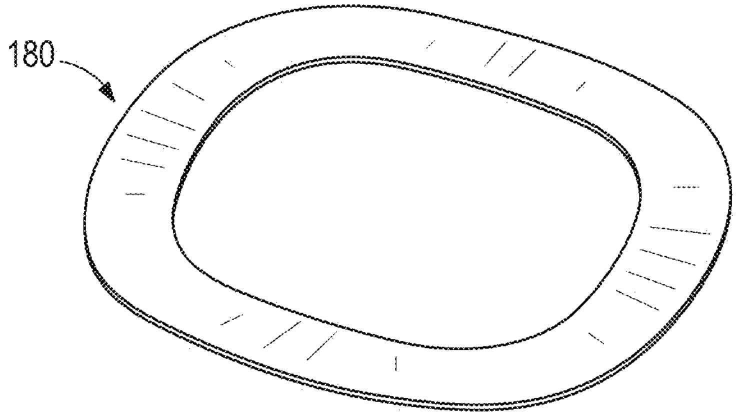
FIG. 21A illustrates another example of a spring for use with the stand light of FIG. 1.
Figure 21B:
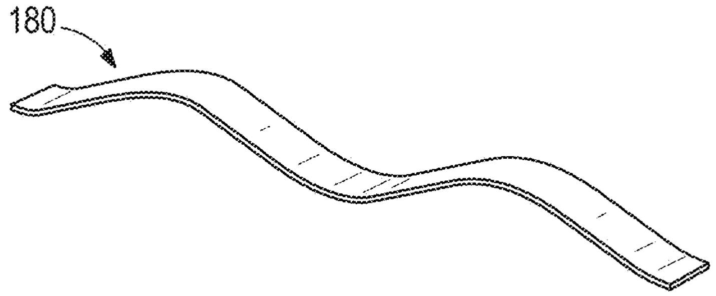
FIG. 21B illustrates another view of the spring of FIG. 21A.

FIGS. 21A and 21B illustrate components for use in another embodiment of a friction fit system 98, which is similar to the friction fit system 98 shown in FIGS. 17-19B. However, instead of the annular Marcel expander-type springs 175, a spring 180 embodied as a wave washer is provided to perform this function. The spring 180 is inserted between the bushing 170 and the extension pole 105 to force this bushing 170 outward or inward, thus creating friction between adjacent extension poles 105.

Figure 22:
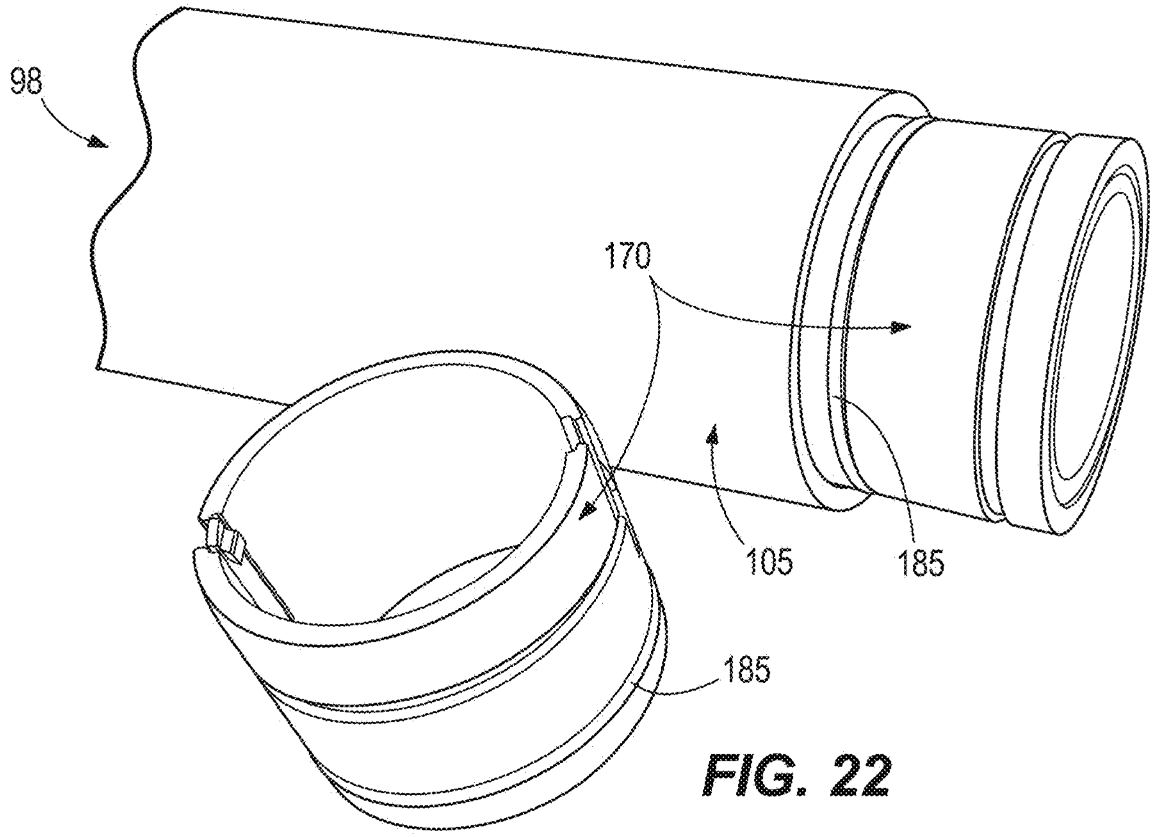
FIG. 22 illustrates a friction fit system for use with the stand light of FIG. 1.
Figure 23:
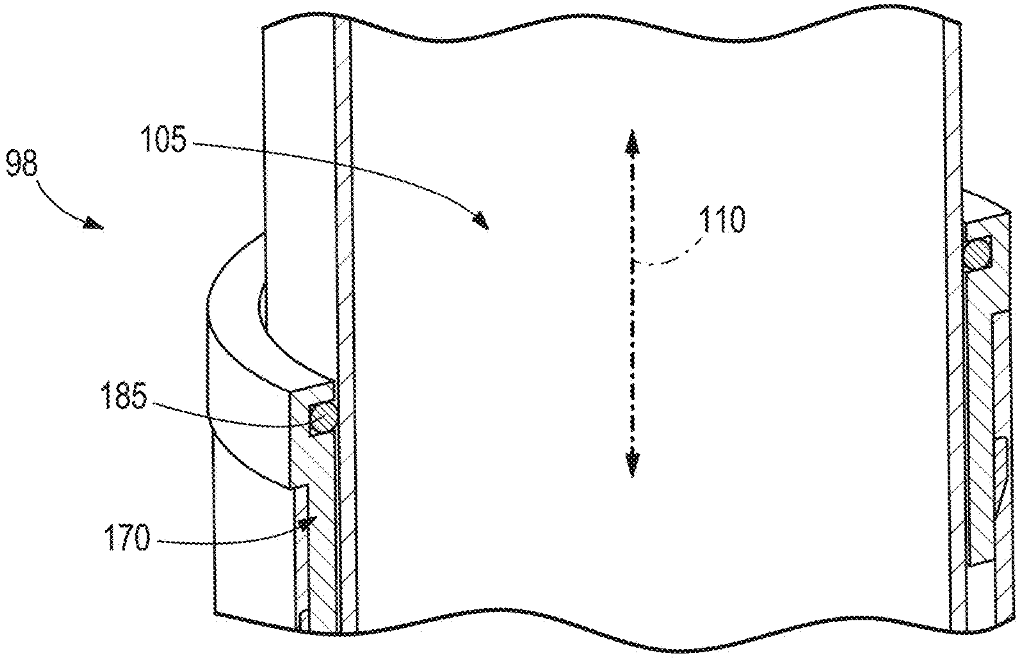
FIG. 23 illustrates a section view of a portion of the stand light of FIG. 1 with the friction fit system.

FIGS. 22 and 23 illustrate another embodiment of a friction fit system 98. In this example, instead of the annular Marcel expander-type spring 175 or wave washer-type spring 180, an O-ring 185 is provided to perform a similar function. The O-ring 185 is inserted between the bushing 170 and the extension pole 105. However, in contrast to the example using the spring 175, 180 to force this bushing 170 outward relative to the longitudinal axis 110, the bushing 170 is relatively stiff and the O-ring 185 is forced by the bushing 170 into contact with the extension pole 105 within the bushing 170. Thus, the force of the O-ring 185 on the inner extension pole 105 forces the bushing radially outward with respect to the longitudinal axis 110 to create friction to retain the inner extension pole 105 relative to the outer extension pole 105 or between the outer extension pole and the protective casing 107.

Figure 24:
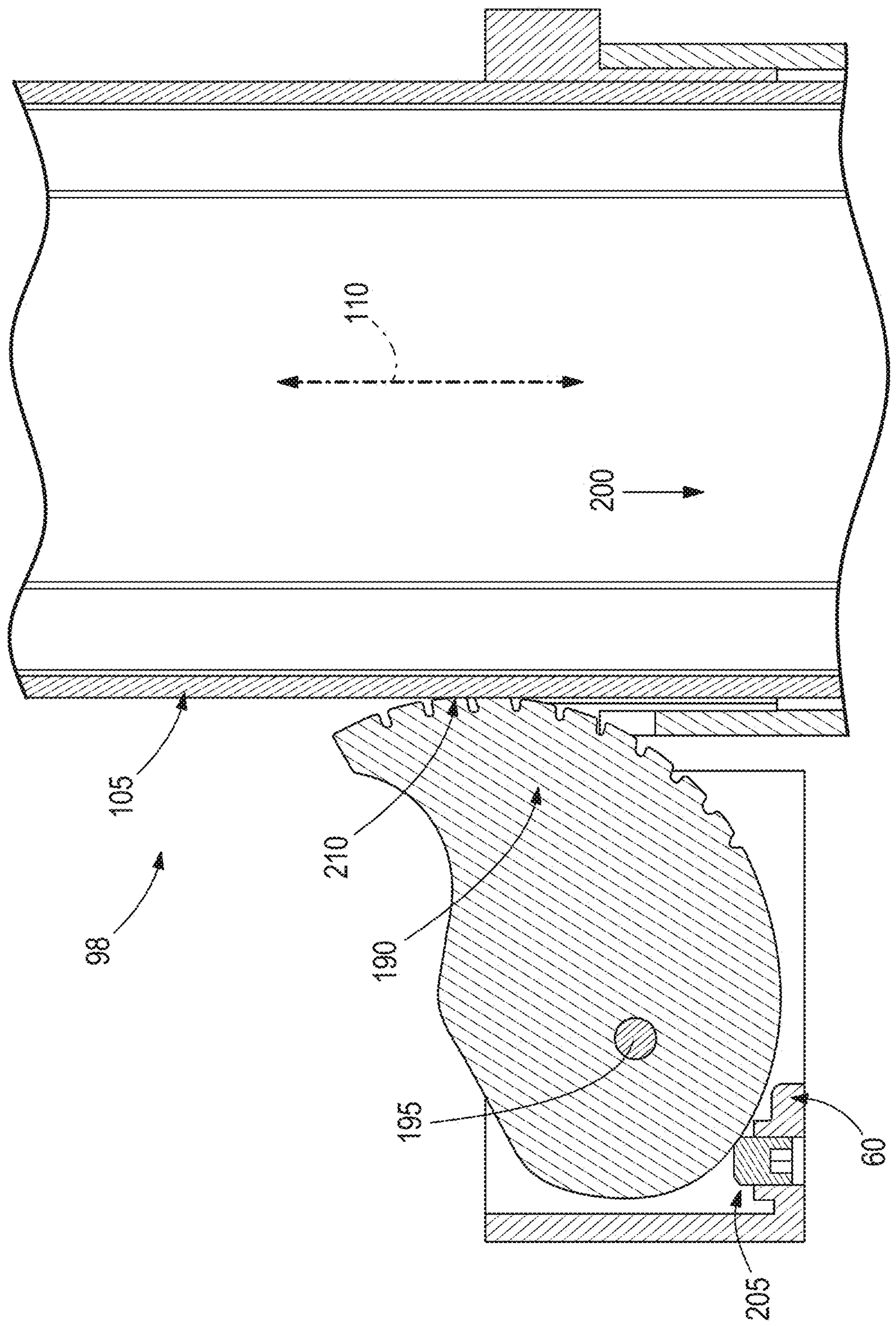
FIG. 24 illustrates another example of a friction fit system for use with the stand light of FIG. 1.

FIG. 24 illustrates another embodiment of a friction fit system 98 for retaining the extension poles 105 in an extended position. The friction fit system 98 shown in FIG. 24 utilizes a cam 190. The cam 190 is mounted to the body 60 and is rotatable about a cam rotational axis 195. The weight of the light head 55 and the extension poles 105 acting in the direction of gravity 200 cause an engagement surface 210 of the cam 190 to engage the extension pole 105. In some examples, a spring 205 is provided to bias the cam 190 in a rotational direction that causes the engagement surface 210 to engage the extension pole 105 (e.g., clockwise as shown in FIG. 24). The use of the spring 205 is not required, but can assist in creating a tight engagement between the engagement surface 210 of the cam 190 and the extension pole 105. Regardless of whether a spring 205 is provided, after the cam 190 engages the extension pole 105, a user actuates a trigger or another element to disengage the cam 190 and move the extension pole 105 in the direction of gravity 200. Due to the shape of the cam 190 and engagement surface 210, the extension pole 105 is freely moveable in a direction opposite of the direction of gravity 200 along the longitudinal axis 110.

Figure 25:
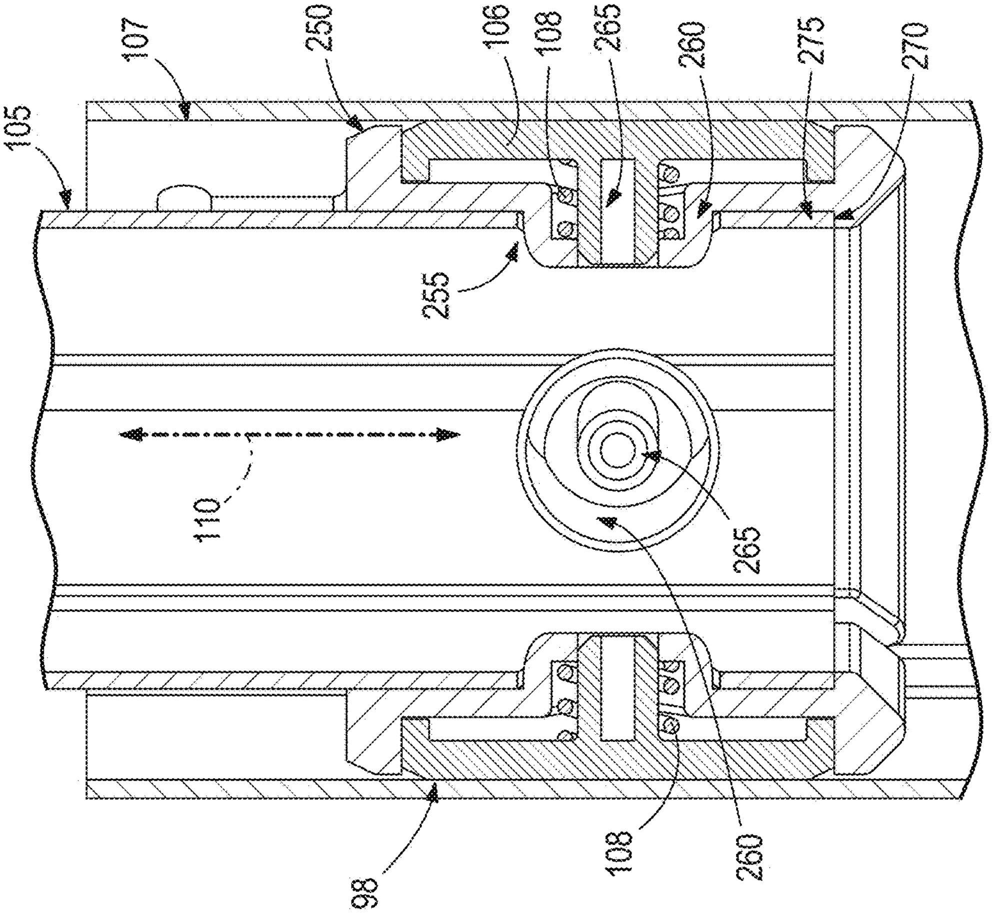
FIG. 25 illustrates another section view of a portion of the stand light of FIG. 1 and illustrates an exemplary friction fit system.

FIG. 25 illustrates an example of a friction fit system 98, which is similar to that shown in FIG. 17. The system includes the extension pole 105 positioned within the casing 107 such that the extension pole 105 is slidable into and out of the protective casing 107 along the longitudinal axis 110. In other examples, a similar configuration to that of FIG. 25 is used between adjacent extension poles 105. The bushing 106, the spring 108, and a seat 250 are positioned between the extension pole 105 and the casing 107 such that the spring 108 acts on the seat 250, which contacts the extension pole 105, thus pushing the bushing 106 radially away from the extension pole 105, thus also biasing the bushing 106 radially away from the longitudinal axis 110. The seat 250 includes a protrusion 260 that is seated within an aperture 255 of the extension pole 105. The protrusion 260 acts to retain the seat 250 in place relative to the extension pole 105 along the longitudinal axis 110. The bushing 106 likewise includes a protrusion 265 that also extends in the aperture 255. The protrusion 260 of the seat 250 is hollow such that the protrusion 265 extends within the protrusion 260 while extending into the aperture 255. The spring 108, which is in this example a generally cylindrical coil spring, is positioned around the protrusion 265 of the bushing 106, which is also generally cylindrical. The spring 108 is likewise seated within the protrusion 260, and extends into the aperture 255. The spring 108 therefore biases the interior of the protrusion 260 away from the bushing 106 to ultimately create the frictional force between the extension pole 105 and the casing 107 or adjacent extension pole 105.

The seat 250 also includes a lip 270 that extends over and around an end 275 of the extension pole 105. While the protrusion 260 of the seat 250 acts to retain the seat 250 in place relative to the extension pole 105, the lip 270 creates a barrier so that the extension pole 105 does not move, relative to the longitudinal axis 110, past the seat 250 when the extension pole 105 is pushing into the casing 107.

Figure 26:
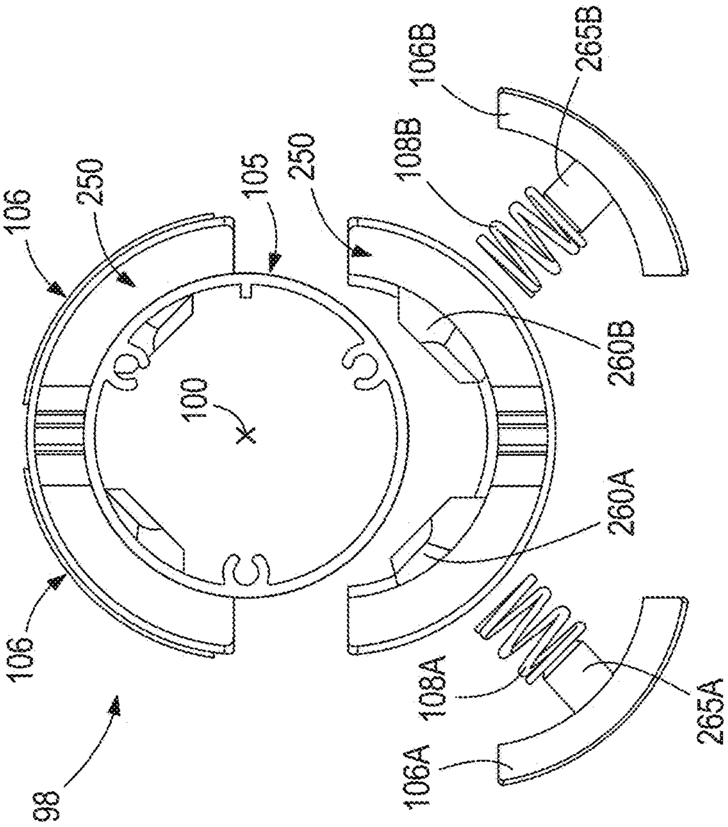
FIG. 26 illustrates a partial assembly view of the friction fit system according to FIG. 25.

FIG. 26 illustrates another view of the friction fit system 98 illustrated in FIG. 25 viewed along the longitudinal axis 110. The example in FIG. 26 illustrates an example including four bushings 106 spaced equally around the circular cross-section of the extension pole 105. However, there are only two seats 250 because each seat 250, in the example in FIG. 26, receives two spring 108 and bushing 106 combinations. Stated otherwise, the seat 250 includes a first protrusion 260A and a second protrusion 250B. The first and second protrusions 250A, 250B are spaced radially about the extension pole 105 and are received within a respective aperture 255 (obscured in FIG. 26). The first protrusion 260A receives a first spring 108A, which is positioned around a first protrusion 265A of the first bushing 106A. The second protrusion 260B receives a second spring 108B, which is positioned around a second protrusion 265B of the first bushing 106B. In the example shown in FIG. 26, the seat 250 extends about halfway around the extension pole 105, and thus two seats 250 (and therefore four springs 108 and bushings 106 in total) are used to extend around an entire circumference of the extension pole 105.

Figure 27:
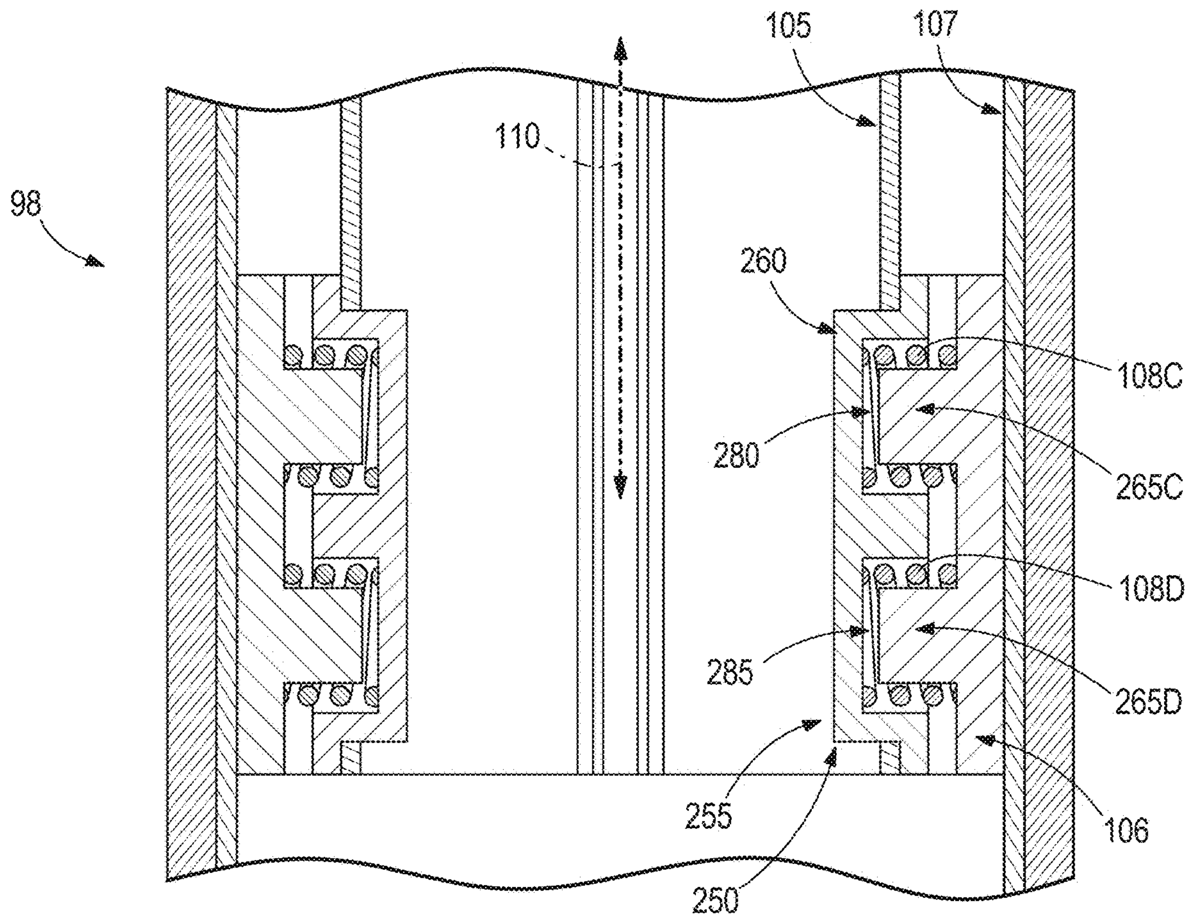
FIG. 27 illustrates another section view of a portion of the stand light of FIG. 1 and illustrates an exemplary friction fit system.

FIG. 27 illustrates another example of a friction fit system 98 similar to that shown in FIGS. 25 and 26, although the example in FIG. 27 includes several design changes compared to the example in FIGS. 25 and 26. The aperture 255 is elongated such that the aperture 255 receives a protrusion 260 that is significantly longer along the longitudinal axis 110 than the example in FIG. 25. The protrusion 260 is longer because the seat 250 includes a first cavity 280 and a second cavity 285, which are formed within the protrusion 260. The first cavity 280 receives a first protrusion 265C, while the second cavity 285 receives a second protrusion 265D. Both the first protrusion 265C and the second protrusion 265D are formed on a single bushing 106. The first and second cavities 280, 285 are spaced along the longitudinal axis 110 (e.g., vertically when the stand light 50 is in the upright position). Thus, the first and second protrusions 265C, 265D and corresponding springs 108C, 108D are also spaced along the longitudinal axis 110. The first protrusion 265C includes a first spring 108C positioned around the first protrusion 265C, and the second protrusion 265D includes a second spring 108D positioned around the second protrusion 265D. Similar to the example shown in FIGS. 25 and 26, the first and second springs 108C, 108D bias the seat 250 away from the bushing 106, so that friction between the bushing 106 and the casing 107 retains the extension pole 105 in place along the longitudinal axis 110 relative to the casing 107.

Figure 28:
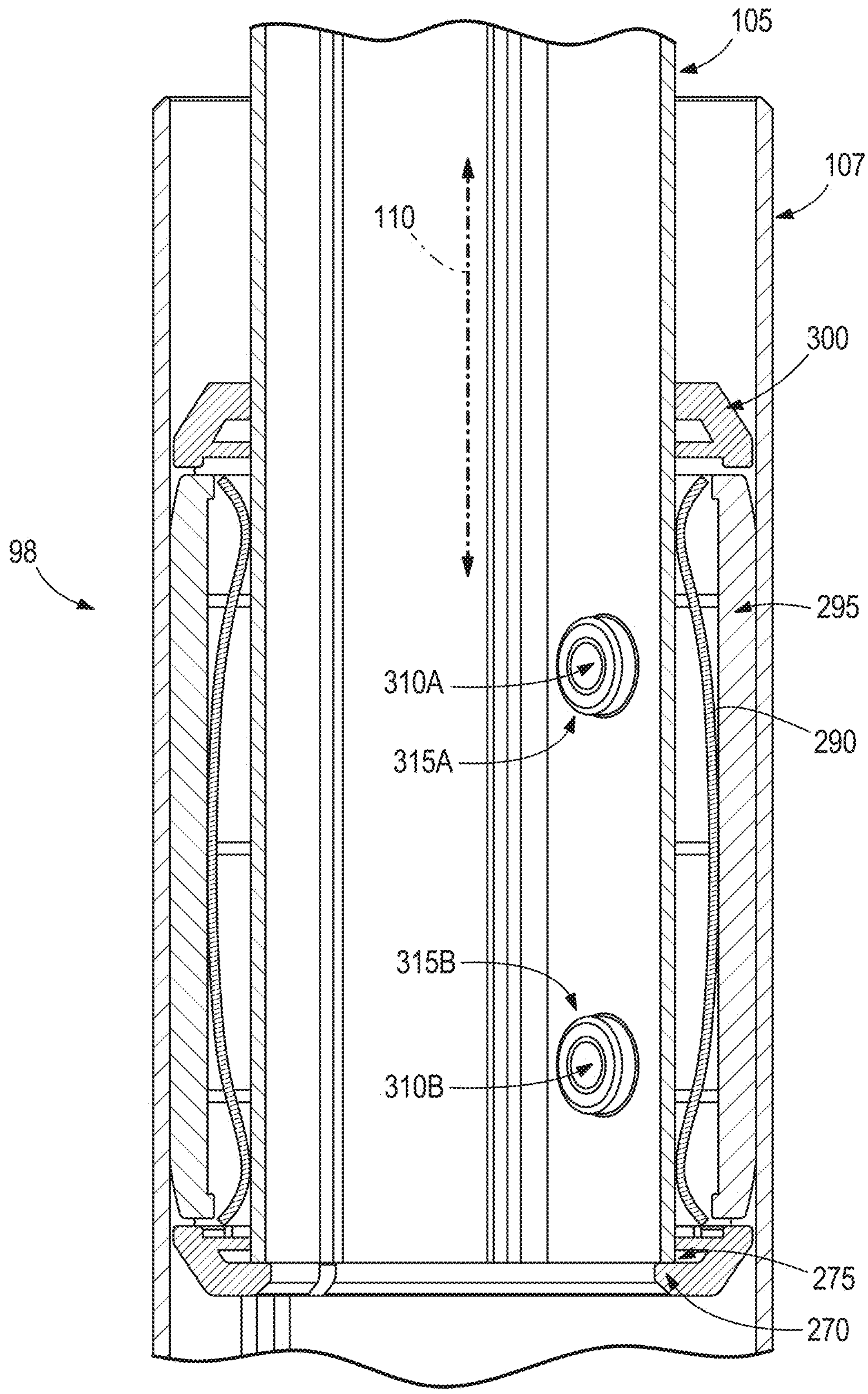
FIG. 28 illustrates another section view of a portion of the stand light of FIG. 1 and illustrates an exemplary friction fit system.
Figure 29:
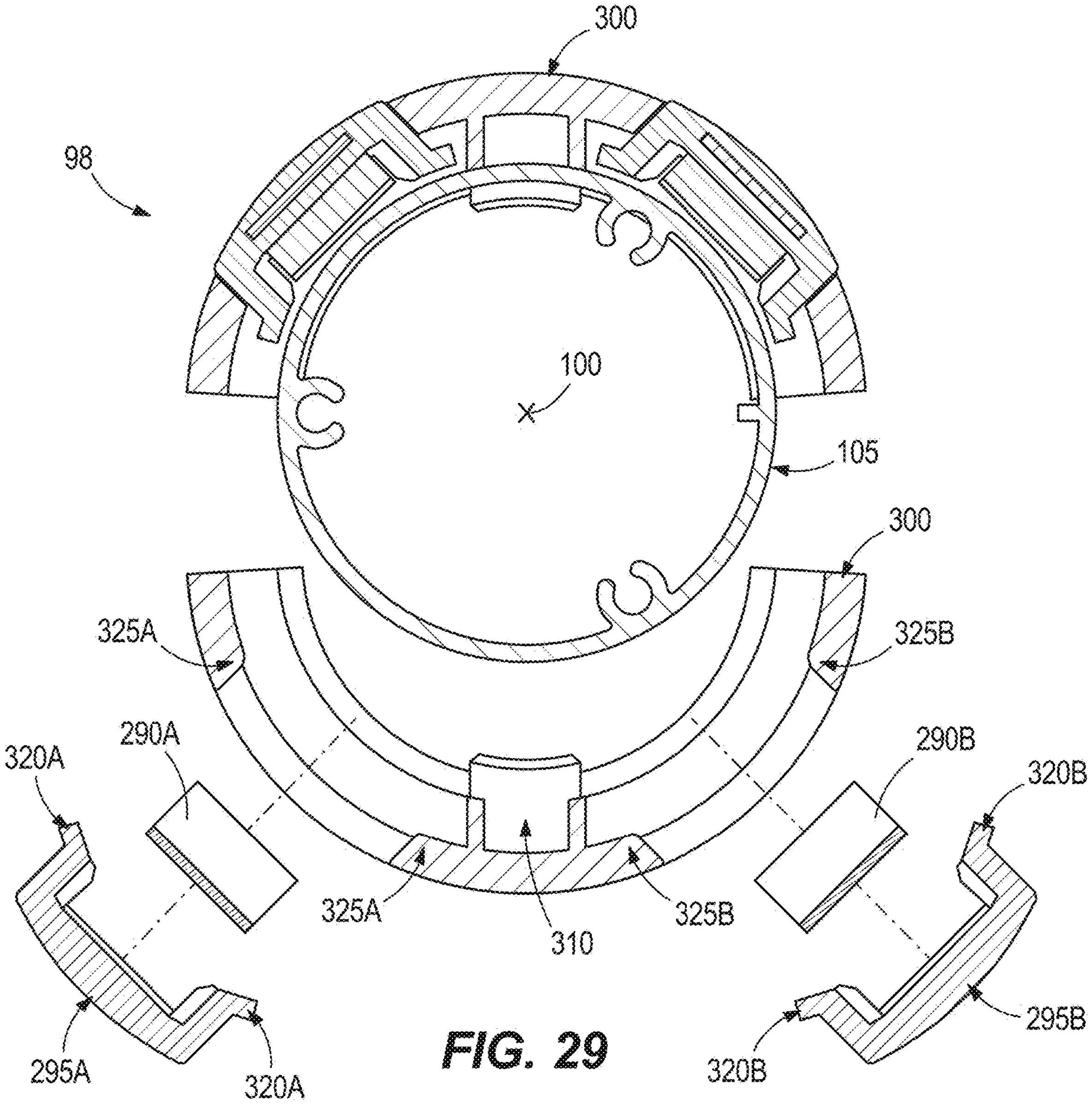
FIG. 29 illustrates a partial assembly view of the friction fit system according to FIG. 28.
Figure 30:
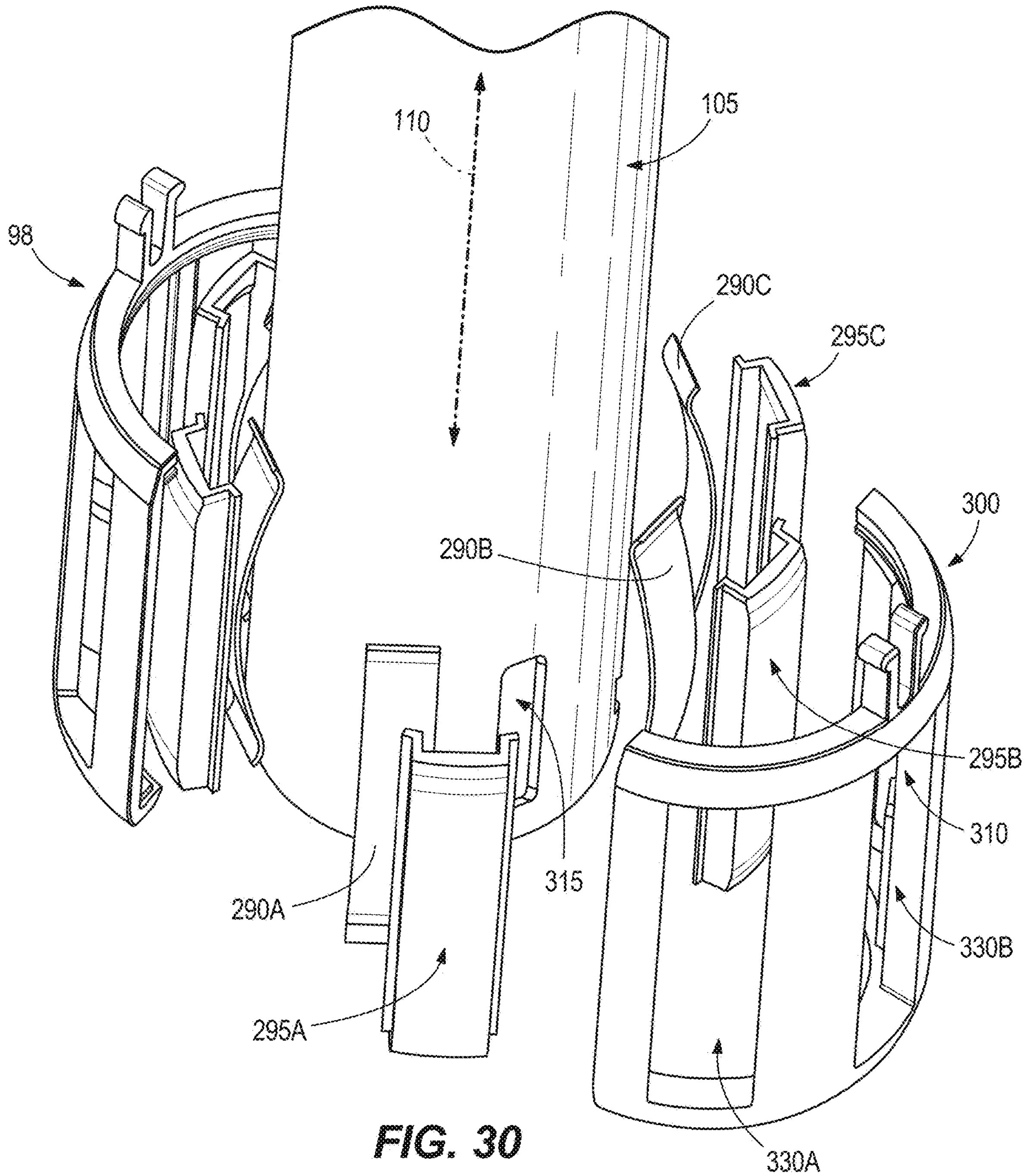
FIG. 30 illustrates another partial assembly view of the friction fit system according to FIG. 28

FIGS. 28-30 illustrate another example of a friction fit system 98, which uses a linear wave spring, i.e., spring 290, instead of the coil spring like that used in the examples shown in FIGS. 25-27. The spring 290 is best shown in the assembly view in FIG. 30. Referring now to FIGS. 28 and 29, the spring 290 is seated within a retainer 295, which is seated within a bushing 300. The spring 290 contacts the extension pole 105 to bias the retainer away from the extension pole 105, which in turn biases the bushing 300 away from the extension pole 105 to contact the casing 107. Friction between the casing 107 and the bushing 300 acts to retain the extension pole 105 in place along the longitudinal axis 110 relative to the casing 107. The bushing 300 includes protrusions 310, which are received within apertures 315. In the example shown in FIG. 29, each bushing 300 includes two protrusions 310A, 310B, which are received within respective apertures 315A, 315B of the extension pole 105. The apertures 315A, 315B are spaced along the longitudinal axis 110.

As shown in FIG. 29, the bushing 300 in this example includes two springs 290A, 290B and corresponding retainers 295A, 295B. More specifically, the bushing 300 includes a first cavity 305A, in which the retainer 295A is seated, which retains a spring 290A. The bushing 300 also includes a second cavity 305B, in which the retainer 295B is seated, which retains a spring 290B. The bushing 300 extends about halfway around the extension pole 105, and thus two bushings 300 (and therefore four springs 290 and retainers 295) are used to extend around an entire circumference of the extension pole 105. Each of the retainers 295A, 295B include flared portions 320A, 320B. The flared portions engage respective seats 325A, 325B such that, as the springs 290A, 290B bias the retainers 295A, 295B radially away from the extension pole 105, the retainers 295A, 295B engage the seats 325A, 325B of the bushing 300 to bias the bushing 300 against the casing 107 or an adjacent extension pole.

In the example shown in FIG. 30, each bushing 300 retains three springs 290A, 290B, and 290C with three corresponding retainers 295A, 295B, and 295C. The bushing 300, like the example in FIGS. 28 and 29, also extends about halfway around the extension pole 105. FIG. 30 also illustrates the aperture 315, although the aperture 315 is shaped differently than the examples shown in FIGS. 28 and 29. Instead of the generally circular apertures 315 shown in FIGS. 28 and 29, the aperture 315 in FIG. 30 is rectangular. The protrusion 310 is a corresponding rectangular shape so that it can be received within the aperture 315, thus fixing the bushing 300 relative to the extension pole 105. FIG. 30 also illustrates retainer cavities 330A, 330B within the bushing 300. The third cavity in the bushing 300 is obscured in FIG. 30. When the retainers 295A, 295B are seated within the bushing 300, the retainers 295A, 295B extend from the radial inner-side of the bushing 300, through the cavities 330A, 330B, and out of the radially outer-side of the bushing 300. This also can be seen in the bushing 300 illustrated at the top of FIG. 29. Thus, when the springs 290A, 290B push the retainer 295A, 295B radially away from the extension pole 105, the retainer 295A, 295B, as well as the bushing 300, is biased into contact with the casing 107 or adjacent extension pole, which creates friction to retain the extension pole 105 in place relative to the casing 107.

It is to be understood that the invention is not limited in its application to the details of construction and the arrangement of components set forth in the following description or illustrated in the following drawings. The invention is capable of other embodiments and of being practiced or of being carried out in various ways.

What is claimed is:

1. A portable stand light comprising:

a casing having a first end, a second end opposite the first end, and a longitudinal axis extending through the first end and the second end;

an extension pole slidably received in the casing and being coaxial with the casing, the extension pole being movable out of the first end of the casing between an extended position and a retracted position;

a light head coupled to an end of the extension pole;

a plurality of legs, each leg including a first end hingedly coupled to the casing and a second end opposite the first end, the second end of each leg being movable between a collapsed position against the casing and an expanded position in which each leg is expanded apart from the casing; and a friction fit system provided between the extension pole and the casing, the friction fit system configured to apply a force to create friction between the extension pole and the casing, thus retaining the extension pole in the extended position relative to the casing, wherein the friction fit system includes a bushing abutting an inside wall of the casing, a seat abutting an outside wall of the extension pole, and a spring positioned between the bushing and the seat, the spring configured to apply the force to the bushing to bias the outside wall of the extension pole away from the inside wall of the casing to create the friction between the extension pole and the casing, thus retaining the extension pole in the extended position relative to the casing.

2. The portable stand light of claim 1, wherein the spring is a first spring, and wherein the friction fit system also includes a second spring, the second spring also configured to apply a force to the bushing to create friction between the extension pole and the casing.

3. The portable stand light of claim 2, wherein the bushing includes a first cavity and a second cavity spaced apart from the first cavity along the longitudinal axis, and wherein the first spring is seated in the first cavity and the second spring is seated in the second cavity.

4. The portable stand light of claim 1, wherein the bushing is a first bushing, wherein the friction fit system also includes a second bushing and a second spring provided between the extension pole and the casing, and wherein the first bushing is spaced radially apart from the second bushing around the extension pole.

5. The portable stand light of claim 4, wherein the spring is a coil spring.

6. The portable stand light of claim 4, wherein the spring is a linear wave spring.

7. The portable stand light of claim 1, wherein the extension pole includes an aperture therein, the aperture receiving a protrusion of the seat such that the seat is inhibited from moving relative to the extension pole along the longitudinal axis.

8. The portable stand light of claim 7, wherein the bushing includes a protrusion, and wherein the spring is positioned around the protrusion of the bushing.

9. The portable stand light of claim 8, wherein the protrusion of the bushing and the spring positioned around the protrusion of the bushing extend into the protrusion of the seat.

10. The portable stand light of claim 1, wherein the spring is positioned between the extension pole and a retainer, the retainer being seated within the bushing, such that the spring biases the retainer radially away from the extension pole, which biases the bushing radially away from the extension pole, which contacts the casing.

11. The portable stand light of claim 10, wherein the extension pole includes an aperture therein, the aperture receiving a protrusion of the bushing such that the bushing is inhibited from moving relative to the extension pole along the longitudinal axis.

12. A portable stand light comprising:

a casing having a first end, a second end opposite the first end, and a longitudinal axis extending through the first end and the second end;

a first extension pole slidably received in the casing and being coaxial with the casing, the first extension pole being movable out of the first end of the casing between an extended position and a retracted position;

a second extension pole slidably received in the first extension pole and being coaxial with the casing and the first extension pole, the second extension pole being movable out of the first extension pole between an extended position and a retracted position;

a light head coupled to an end of the second extension pole;

a plurality of legs, each leg including a first end hingedly coupled to the casing and a second end opposite the first end, the second end of each leg being movable between a collapsed position against the casing and an expanded position in which each leg is expanded apart from the casing; and a friction fit system provided between the first extension pole and the second extension pole, the friction fit system configured to create friction between the first extension pole and the second extension pole to retain the second extension pole in the extended position relative to the first extension pole, wherein the friction fit system includes a bushing abutting an inside wall of the first extension pole, a seat abutting an outside wall of the second extension pole, and a spring positioned between the bushing and the seat, the spring configured to apply a force to the bushing to bias the outside wall of the second extension pole away from the inside wall of the first extension pole to create the friction between the bushing and the first extension pole, thus retaining the second extension pole in the extended position relative to the first extension pole.

13. The portable stand light of claim 12, wherein the bushing is a first bushing, and wherein the friction fit system also includes a second bushing and a second spring provided between the first extension pole and the second extension pole.

14. The portable stand light of claim 12, wherein the second extension pole includes an aperture therein, the aperture receiving a protrusion of the seat such that the seat is inhibited from moving relative to the second extension pole along the longitudinal axis.

15. The portable stand light of claim 14, wherein the bushing includes a protrusion, wherein the spring is positioned around the protrusion of the bushing, and wherein the protrusion of the bushing and the spring positioned around the protrusion of the bushing extend into the protrusion of the seat.

16. The portable stand light of claim 12, wherein the spring is positioned between the second extension pole and a retainer, the retainer being seated within the bushing, such that the spring biases the retainer away from the second extension pole, which biases the bushing away from the second extension pole, which contacts the first extension pole.

* * * * *